(12) United States Patent
Bruno et al.

(10) Patent No.: US 8,387,611 B2
(45) Date of Patent: Mar. 5, 2013

(54) BARBECUE GRILL WITH SEAR SECTION

(75) Inventors: Adrian A. Bruno, Rolling Meadows, IL (US); Erich Schlosser, Barrington, IL (US)

(73) Assignee: Weber-Stephen Products Co., Palatine, IL (US)

( * ) Notice: Subject to any disclaimer, the term of this patent is extended or adjusted under 35 U.S.C. 154(b) by 667 days.

(21) Appl. No.: 12/141,343

(22) Filed: Jun. 18, 2008

(65) Prior Publication Data

US 2009/0314278 A1      Dec. 24, 2009

(51) Int. Cl.
*A47J 37/06* (2006.01)
(52) U.S. Cl. .......... 126/41 R; 126/25 R; 126/39 E; 126/1 R; 126/19.5; 126/39 J; 431/278; 431/281; 99/339; 99/388; 251/207; 251/309
(58) Field of Classification Search ........... 126/41 R, 126/25 R, 39 E, 1 R, 19.5, 39 J; 431/278, 431/281; 99/339, 388; 251/207
See application file for complete search history.

(56) References Cited

U.S. PATENT DOCUMENTS

| | | | |
|---|---|---|---|
| 3,092,169 A * | 6/1963 | Lohman | 431/191 |
| 3,638,635 A * | 2/1972 | Drennan | 126/41 R |
| 3,931,805 A * | 1/1976 | Nelson | 126/41 R |
| 4,816,647 A * | 3/1989 | Payne | 219/448.12 |
| 6,067,978 A | 5/2000 | Schlosser | |
| 6,102,029 A | 8/2000 | Stephen | |
| 6,125,836 A | 10/2000 | Felton, Jr. | |
| 6,389,960 B1 * | 5/2002 | Williams et al. | 99/339 |
| 6,520,481 B2 | 2/2003 | Harneit | |
| 6,640,799 B2 | 11/2003 | Kahler et al. | |
| 6,845,966 B1 | 1/2005 | Albizuri | |
| 7,241,466 B2 * | 7/2007 | Dellinger | 426/523 |
| 7,798,139 B2 * | 9/2010 | Gagas et al. | 126/25 R |

(Continued)

FOREIGN PATENT DOCUMENTS

| | | |
|---|---|---|
| DE | 29922811 U1 | 2/2000 |
| DE | 10038358 A1 | 7/2001 |

(Continued)

OTHER PUBLICATIONS

"The Sear Zone"—by Alfresco Grills (owners manual); undated.

(Continued)

*Primary Examiner* — Steven B McAllister
*Assistant Examiner* — Avinash Savani
(74) *Attorney, Agent, or Firm* — Baker & McKenzie LLP

(57) ABSTRACT

Various embodiments of a gas valve and a sear-zone gas burner are described and claimed herein. One embodiment described herein relates to a cooking chamber with a cooking surface, which has at least two portions including a first portion and a second portion. The first and second portions of the cooking surface each have at least one heat source disposed underneath. The at least one heat source for each cooking surface in turn has a highest setting such that a first maximum heat output is provided to the first portion of the cooking surface when set at the highest setting and a second maximum heat output is provided to the second portion of the cooking surface when set at highest setting, wherein the second maximum heat output provided to the second portion is greater than the first maximum heat output provided to the first portion of the cooking surface.

18 Claims, 19 Drawing Sheets

U.S. PATENT DOCUMENTS

| | | | | |
|---|---|---|---|---|
| 8,030,598 B2 * | 10/2011 | Bachinski et al. | ............ | 219/386 |
| 2002/0175213 A1 * | 11/2002 | Wodeslavsky | .............. | 236/20 A |
| 2003/0213484 A1 | 11/2003 | Alden | | |
| 2007/0028912 A1 | 2/2007 | Gagas et al. | | |
| 2007/0048683 A1 * | 3/2007 | Huff | .............................. | 431/281 |
| 2008/0128406 A1 | 6/2008 | Bachinski et al. | | |

FOREIGN PATENT DOCUMENTS

| | | | |
|---|---|---|---|
| DE | 20317505 U1 | 2/2004 | |
| GB | 2407865 A | 5/2005 | |

OTHER PUBLICATIONS

"Star Professional Outdoor Grill—SSG Series" by Star Manufacturing International (Installation and Operating Instructions) Rev. A Jan. 31, 2005.

"BBQSource-Forums.com"—a webpage sponsored by the BBQ Source—a string of blogs about searing and infrared systems dated Jul. 2006.

"Altima Professional Stainless Steel Grill—Use and Care Manual"—by Sure Heat Manufacturing; undated.

* cited by examiner

BARBECUE GRILL WITH SEAR SECTION

FIELD OF THE INVENTIONS

Some of the embodiments described and claimed herein relate generally to barbecue grills, wherein at least a portion of the grilling surface is configured for searing food. More specifically, at least some of the embodiments described and claimed herein have a multi-use cooking zone, where the multi-use cooking zone can be used for normal grilling or for searing food. Other embodiments described and claimed herein relate to gas control valves and/or supplementary gas burner tubes, which may be configured to provide the intense heat required for searing foods.

BACKGROUND OF THE INVENTIONS

As mentioned above, some of the embodiments described herein relate to a multi-use cooking zone which is configured for both searing of food and normal cooking. The cooking technique known as "searing" is well known in the art and is used by many connoisseurs, especially when cooking fish and meat. Searing of food involves the application of direct and intense heat to the food, which causes food to rapidly cook on the outside, but not on the inside. In this manner, the outside surface of the food is slightly singed or burnt, which effectively locks the natural juices and/or marinade into the food. After searing, the meat is usually rare on the inside and can be eaten. Alternatively, the meat can be cooked in a conventional manner to achieve a medium or well done appearance.

Prior art barbecue grills use various means for searing food. For example, some manufacturers incorporate infrared (IR) burners into their barbecue grills, which are capable of producing the intense heat required for searing food. The searing (IR) burners of the prior art grills are typically disposed underneath the cooking surface and replace at least one standard burner. Usually, the IR burner sits below approximately ¼ to ⅓ of the cooking surface while the standard burners sit below approximately ⅔ to ¾ of the cooking surface.

While the prior art IR burners are very effective at searing foods, because of the intense heat they can generate, the IR burners are not very effective at cooking foods in a conventional manner. Even though some IR burners include temperature controls, the low setting for an IR burner is still hotter than the high setting for a typical standard burner. In that respect, IR burners are not typically capable of cooking food slowly at low heat, which is usually required for thick cuts of meat. For this reason, some manufacturers of grills having IR burners recommend first searing the food above the IR burners, and then moving the food over the standard burners to finish cooking the food in a conventional manner. Because the IR burners are not effective at cooking foods conventionally, the portion of the cooking surface which sits above the IR burners is essentially lost space—only the portion of the cooking surface which sits above the standard burner tubes is usable space for conventional grilling.

Accordingly, there is a need in the art for a heat source for a barbecue grill which is capable of providing both the intense heat required for searing of foods and the low heat required for slow cooking. There is also a need in the art for a barbecue grill which is capable of searing foods, but makes more efficient use of the cooking surface as compared to the prior art grills.

One potential solution to the above mentioned problems, which is suggested herein, would be to use a standard burner in combination with a gas flow control valve that has an increased capacity, instead of using an IR burner. While this solution seems "simple" at first glance, this solution has some significant drawbacks. For instance, most valves are configured to provide only 50% of the maximum flow at a low setting. Therefore, increasing the "high" flow capabilities of the valve will also increase the "low" flow capabilities of the valve, thereby having a detrimental effect on the low temperature cooking capabilities of the barbecue grill. For example, a typical valve which is used for larger grill application provides roughly 12,000 BTUH at a high setting and roughly 6,000 BTUH at a low setting. Typical valves which are used for small grill applications provide roughly 6,000 BTUH at a high setting and roughly 3,000 BTUH at a low setting. It can be said then that while the use of a larger "off-the-shelf" valve in combination with a standard burner will be capable of providing the intense heat needed to sear food, such configuration will not be very effective at cooking low and slow.

To effectively utilize the solution proposed above, there is a need in the art for a valve which is capable of providing additional flow capacity at a high setting without having to sacrifice the low end capacity of the valve.

Other embodiments described and claimed herein relate to gas control valves for barbecue grills, which have beneficial features not found in the prior art. Many barbecue grill manufacturers currently use linearly regulated gas valves (or control valves) for adjusting the flow of gas to the burner tube of the grill. These valves generally provide linear flow from a high flow setting to a low flow setting in order to allow the user to vary the heat output of a barbecue grill. These prior art valves are also configured to prevent the interruption of gas flow, for example between high, medium, and low settings, whereby the flame will not be extinguished when the user adjusts the valve. Examples of such gas valves are disclosed in U.S. Pat. No. 6,520,481 ("the '481 patent") and U.S. Pat. No. 6,845,966 ("the '966 patent").

Gas valves for barbecue grills typically have four gas flow settings: off, high, medium, and low, typically disposed in that order; i.e. the first setting obtained by rotating the valve stem from the off setting is the high, or maximum, setting. Further rotation of the valve stem would reduce the gas flow (i.e., the heat provided to the cooking chamber) to the medium setting and then, finally, to the low setting. The stem of the valve typically positively engages with the valve body (or valve cover) at the off, high, and low settings. For example, with reference to FIG. 7 of the '481 patent, the valve cap of the '481 patent includes two detents, one at the off setting and one at the high setting, which positively engage with an indexing rod which depends from the valve stem. The valve cap of the '481 patent also includes a vertical stop which positively engages with the indexing rod at the low setting.

A typical valve of the prior art regulates flow by restricting the flow area of the valve. The valves typically include an orifice at the exit of the valve and a valve plug which restricts the flow area at the inlet of the valve (note that some valves have an orifice at the inlet and the valve plug restricts the flow area the outlet of the valve). When the valve is in the fully open, or maximum flow position, the flow area at the inlet of the valve is not restricted. As such, the orifice at the outlet of the valve regulates the flow. When the valve is set to a lower flow position, the valve plug plays a large part in controlling the flow rate of the valve. In the lower flow positions, the valve plug restricts the flow area at the inlet of the valve, providing resistance to the flow.

While the prior art gas control valves successfully regulate gas flow to burner tubes, there are a number of problems with the current gas control valves which have not been solved. For example, it is a widely accepted convention in the industry that gas control valves for barbecue grills require the user to rotate the valve stem 90° from the off setting in order to reach the high, or maximum flow, setting. There are a number of problems associated with this convention. First, significant twisting of the valve stem is required to turn the gas grill on, which is inconvenient for the user. Second, having a large rotational offset between the off setting and the high setting diminishes how finely the user can set the variable flow rate, because it reduces the angular offset between the high and low settings. Although there are a number of innovators in the field, it is believed that none have attempted or all have failed to solve this problem.

Accordingly, there is a need in the art for a valve which reduces the amount of rotation required to turn the grill on. Furthermore, there is a need in the art for a valve having a sear setting, at which the valve provides an increased flow rate sufficient to create searing heat, while also having the capability to provide the high, medium, and low flow rates of the prior art valves. In other words, there is a need in the art for a valve which can not only be used for normal cooking, but also for searing of foods. Even further, there is a need in the art for a valve which not only reduces the amount of rotation required to turn the grill on, but also includes an increased flow capacity to provide searing heat.

SUMMARY OF THE INVENTIONS

Various embodiments of a gas valve and a sear-zone gas burner, which are described and claimed herein, solve at least some of the above-mentioned problems of the prior art. One embodiment described herein relates to a control valve for regulating the flow of gas to a burner tube for a barbecue grill, wherein the control valve includes multiple flow settings, including a sear setting. At the sear setting, the valve is capable of providing additional gas flow to the gas burner to provide the intense heat needed to sear food. At the remaining settings, the valve is capable of providing an appropriate amount of gas flow for conventional cooking of food. Another embodiment described herein relates to a burner tube configuration comprising a plurality of standard burner tubes and at least one supplementary sear-zone burner tube which is operable independently from the standard burner tubes. The sear-zone burner tube supplements the heat generated by the adjacent standard burner tubes to supply the intense heat needed to sear food.

At least some of the embodiments described herein, including those briefly described above, can be used to convert at least a portion of the cooking surface into a multi-use cooking zone, which can be used for both searing of foods and conventional cooking. In the case of a barbecue grill which employs the high capacity valve, the multi-use zone can be used as a sear zone by adjusting the valve to the sear setting. To cook conventionally, the valve would be adjusted to the high, medium or low settings. In the case of a barbecue grill which employs the supplementary sear-zone burner tube, the multi-use zone can be used as a sear zone by adjusting the standard burner tubes and the supplementary burner tube to their high settings. To cook conventionally, the supplementary burner tube would be turned off and the standard burner tubes adjusted to the high, medium, or low settings.

More specifically, a first embodiment of the valve includes a sear setting or position which provides a flow rate which is approximately 120% to 130% of the flow rate provided at a high setting. A second embodiment of the valve includes a flow setting which is angularly offset from the off position by approximately 45°, in order to reduce the amount of rotation necessary to turn the grill on. A third embodiment of the valve includes the features of both the first and second embodiments, in that it includes a sear setting which is angularly offset from the off position by 45°. The third embodiment also includes a high flow, medium flow and low flow setting, just like the valves of the prior art, although the sear setting provides approximately 120% to 130% of the flow rate provided at a high setting. The high flow, medium flow, and low flow settings of the third embodiment are adapted to provide approximately the same amount of flow as a typical prior art valve would when adjusted to the corresponding settings. Although the described embodiment, when set to the sear setting, provides approximately 120% to 130% of the flow rate which is provided at a high setting, it is contemplated that various other embodiments could provide less or more flow (i.e., less that 120% or greater than 130%) at the sear setting.

In order to provide a valve with similar flow characteristics as a typical prior art valve (at the high flow, medium flow, and low flow settings) but which valve also includes a sear setting, significant changes to the prior art valves had to be made. First of all, the valve plug flow restrictor is modified to include additional channels such that the valve provides searing flow when the valve is adjusted to the searing (or highest flow) position, which is angularly offset from the off position by approximately 45°. Second of all, both the outlet orifice and the profile of the prior art flow restrictor, at the high, medium and low flow positions, had to be significantly changed. As discussed above, the maximum flow rate of a typical gas valve is controlled by the outlet orifice. It follows that it would not be possible to significantly increase the flow capacity of the prior art gas valves by increasing the flow area at the inlet of the valve. Accordingly, the valve includes an outlet orifice with a greater diameter in order to obtain sufficient flow capacity. However, a change in the diameter of the outlet orifice impacts the flow characteristics of the valve at the lower flow settings (probably at the high and medium flow settings and possibly at the low flow setting). Therefore, the profile of the prior art valve plug flow restrictor for the high, medium, and low flow positions could no longer be used. See the detailed discussion of the drawings below for further details regarding the changes to the orifice and valve plug.

One embodiment of the supplementary burner tube is adapted to be disposed in a barbecue grill assembly which includes a cooking surface and at least three standard burners. The three standard burner tubes are equally spaced below the cooking surface. The supplementary burner tube is disposed below the cooking surface between two of the at least three standard burner tubes. The portion of the cooking surface which sits generally above the supplementary burner tube is configured for searing of food and conventional cooking of food, whereby the food can be seared when the supplementary burner tube is on and the food can be cooked conventionally when the supplementary burner tube is off. The supplemental burner tube includes a cross-ignition member which directs ignition gas into close proximity with at least one of the adjacent standard burner tubes, whereby the supplemental burner tube uses the flame from an adjacent burner tube for ignition.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

Figure 1:
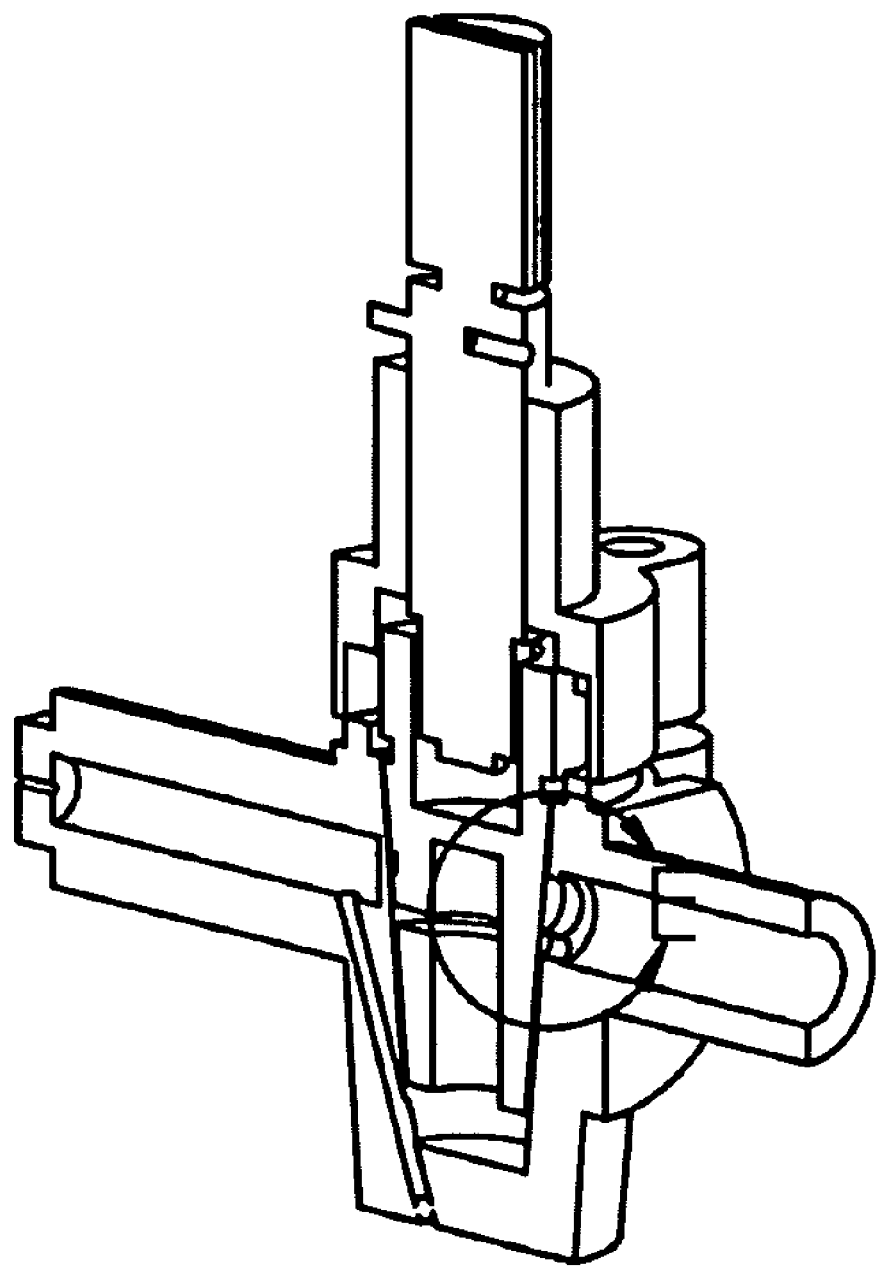
FIG. 1 is a cross-sectional view of an embodiment of a valve having a sear setting.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions claimed herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Referring first to FIG. 1, one embodiment of a valve 10 is shown in cross-sectional view. This valve 10 a high-capacity valve which is configured to be used in conjunction with a standard burner tube (not shown). The valve 10 and burner tube combination, when placed in the highest flow position, is capable of producing the intense heat required for searing of foods. When placed in a lower flow position, the combination can be used for conventional cooking.

The valve 10 is generally comprised of a valve body 20, a valve plug 60, a valve stem 80 and a valve cap 40. The valve body 20 has an inlet 22, a hollow inside 28, and an outlet 32 which define a flow conduit. In other words, the inlet 22 and the outlet 32 of the valve are interconnected by the hollow inside 28, wherein a flow of gas is intended to flow into the valve 10 through the inlet 22 to the hollow inside 28. Then, the gas is directed from the hollow inside 28 to the outlet 32, where the gas leaves the valve 10.

The valve inlet 22 can be characterized as a tubular structure and includes a first port or hole 24 and a second port or hole 26, which separate the inlet 22 from the hollow inside 28. It is contemplated that the number of ports can be increased or decreased. The ports 24 and 26 are depicted as circular, although it is contemplated the valve 10 could function equally well if the ports 24 and 26 had a different shape.

The valve plug 60 is interposed in the flow conduit at the hollow inside 28 of the valve body 20. Flow enters the valve plug 60 through an outside wall 63 to a hollow interior. The hollow interior of the valve plug 60 communicates with the hollow inside 28 of the valve body 20 as depicted in FIG. 1. When disposed in the hollow inside 28 of the valve body 20, the outside wall 63 of the valve body 60 is located adjacent to the ports 24 and 26 of the valve body 20 and the bottom of the valve plug 60 is disposed slightly above the bottom of the hollow inside 28 of the valve body 20. This allows the gas flow leaving the valve plug 60 to enter the diagonal channel 30, as discussed below. To regulate the flow through the ports 24 and 26, the valve plug 60 includes a flow regulator 61 which is aligned circumferentially on the outside wall 63 of the valve plug 60. The flow regulator 61 includes a plurality of channels and/or holes 62, 63, 64, 65, 66, 68, 70, and 72, which are circumferentially aligned on the outside wall 63 of the valve plug. Essentially, these channels and/or holes are adapted to modify the flow rate of gas through the flow area of the ports 24 and 26 by blocking all or a portion of the flow area of each port 24 and 26, depending upon the flow rate desired. The alignment and/or geometry of the channels and/or hole vary about the circumference of the valve plug 60, such that rotation of the valve plug 60 varies the flow rate of gas through the valve. The particular alignment and/or geometry of the shown embodiment of the valve 10 is described in further detail below.

The rotation of the valve plug 60 is controlled by the valve stem 80, which can be characterized as a generally cylindrical structure. The valve stem has an upper end 86 with a notched portion which is adapted to engaged with a grasping means, such as a knob or handle. As such, the upper end 86 of the valve stem 80 is adapted to be disposed outside the valve 10 above the valve cap 40 through the opening 42 in the valve cap 40. The valve stem 80 also includes a stop 84, which is intended to be disposed outside of the valve 10 and which is adapted to engage with an upper surface on the valve cap 40. The valve stem 80 is adapted to interact and/or engage with the valve plug 60, whereby rotation of the valve stem 80 causes the valve plug 60 to rotate. For the purpose of engaging with the valve plug 60, the valve stem 80 includes an indexing rod 82 which is adapted to engage with a slot 76 of the valve plug 60, as is better shown in FIG. 2. The indexing rod 82 extends outwardly from the outer surface 63 of the valve plug such that it may engage with at least one detent in the lower surface of the valve cap, as is described in further detail below. Referring again to FIG. 1, the valve cap 40 is adapted to provide a cover for the valve wherein the valve cap 40 retains the valve plug 60 and the valve stem 80 inside of the body of the valve 20 and retains the valve stem 80 in engagement with the valve plug 60.

The outlet of the valve 32 is generally tubular in structure and includes both a diagonal channel 30 and an orifice 34. The diagonal channel 30 serves to interconnect the outlet 32 with the hollow inside 28 of the valve body 28. The outlet 32 terminates at the orifice 34, which has a diameter sufficient to restrict the flow rate of gas through the valve to the maximum desired flow when the valve 10 is in the fully opened position (i.e. the flow restrictor is aligned to provide maximum flow through the valve, which means that, for the shown embodiment, the flow restrictor does not block the flow area of the ports 24 and 26).

The flow direction of the valve 10 is depicted by arrows in FIG. 1. Although the valve 10 shown as having gas flow entering through the inlet 22 and exiting through the outlet 32, it is contemplated that the flow direction through the valve could be reversed. If the flow direction was reversed, it is believed that the flow characteristics would be substantially similar as the shown embodiment.

As can be ascertained from FIG. 1, the shown embodiment of the valve 10 is generally assembled by first inserting the valve plug 60 into the hollow inside 28 of the valve body 20. The valve stem 80 is then inserted into the top of the valve plug 60 with the indexing rod 82 aligned with the notch 76. During assembly of the valve, it is contemplated that the stop 84 is not present on the valve stem 80, and is inserted only after the valve cap 40 is affixed to the valve body 20. Accordingly, after the valve stem 80 is inserted into the valve plug 60, the cap 40 is attached to the valve body whereby the upper end 86 of the valve stem passes through an opening 42 in the top of the valve cap 40. Any fastening means known in the arc can be used to attached the valve cap 40 to the valve body 20, such as screws and/or bolts. Please note that certain components, which are not necessary to understand the characteristics of the described embodiments, have been omitted from the figures and from the above assembly discussion for clarity purposes. Such components include seals, or o-rings, which are intended to be displaced in channel 78 on the valve plug 60, and a biasing component, or spring, which is intended to be displaced between the valve stem 80 and the valve plug 60 to exert an upward force on the valve stem 80 to urge the indexing rod into the detents in the valve cap 40. The valve may also include additional packing or seals to prevent gas leakage along the valve stem 80.

Turning now to FIGS. 2 through FIG. 6 collectively, exploded views of the valve are shown on the left to detail the relative alignment of the valve components. On the lower-right portion of each figure, a cross-sectional assembly drawing of the valve is provided to show the relative orientation of the valve plug 60 (and the flow restrictor 61) with the ports 24 and 26 on the valve body 20. Above the cross-sectional assembly drawing, in the top-right corner of each figure, a close-up view of the valve plug 60 and the ports 24 and 26 is provided to detail the relative orientation of the flow restrictor 61 with the ports 24 and 26.

Figure 2:
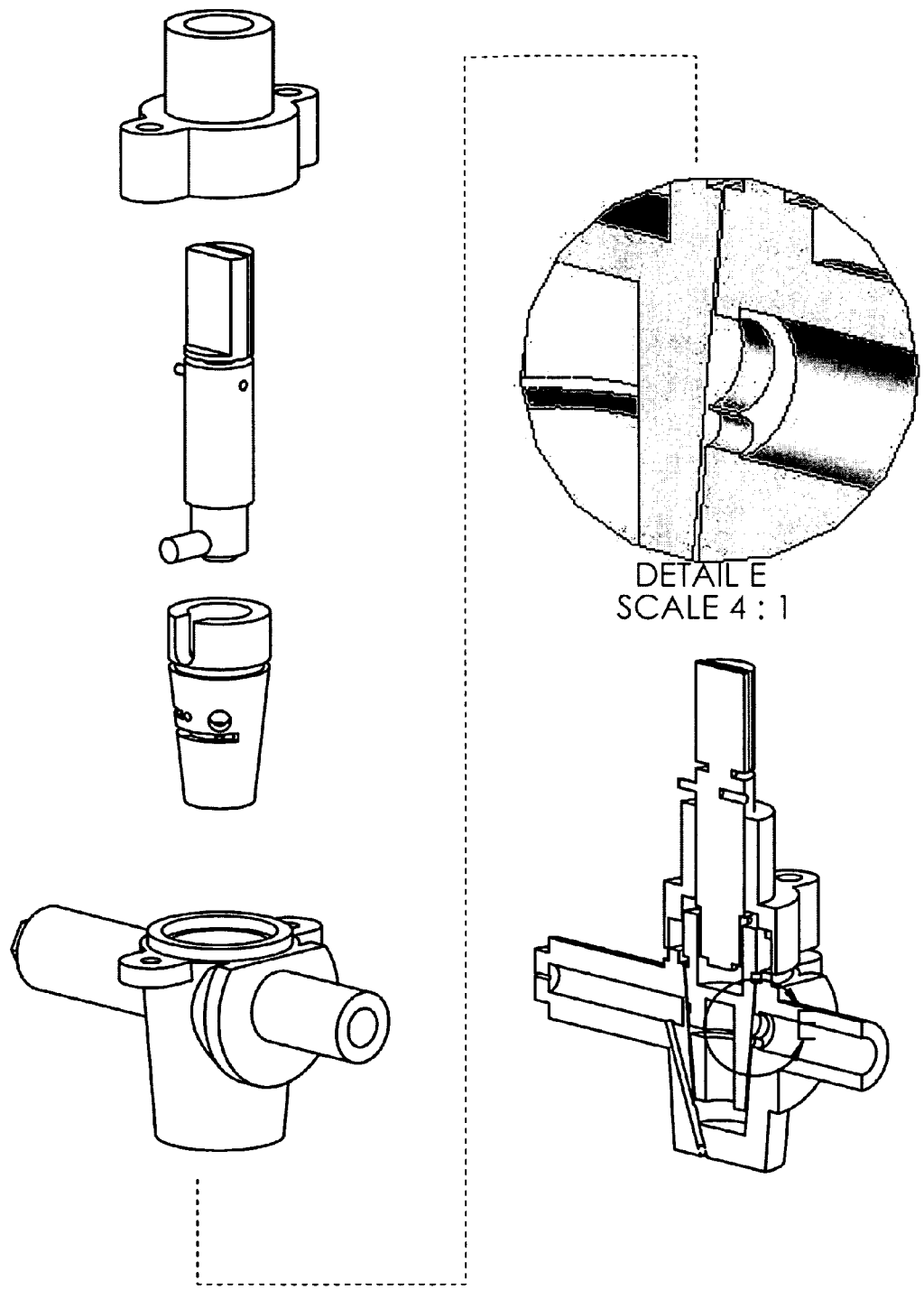
FIG. 2 is an exploded view of the same with the valve components aligned in the off position.
Figure 3:
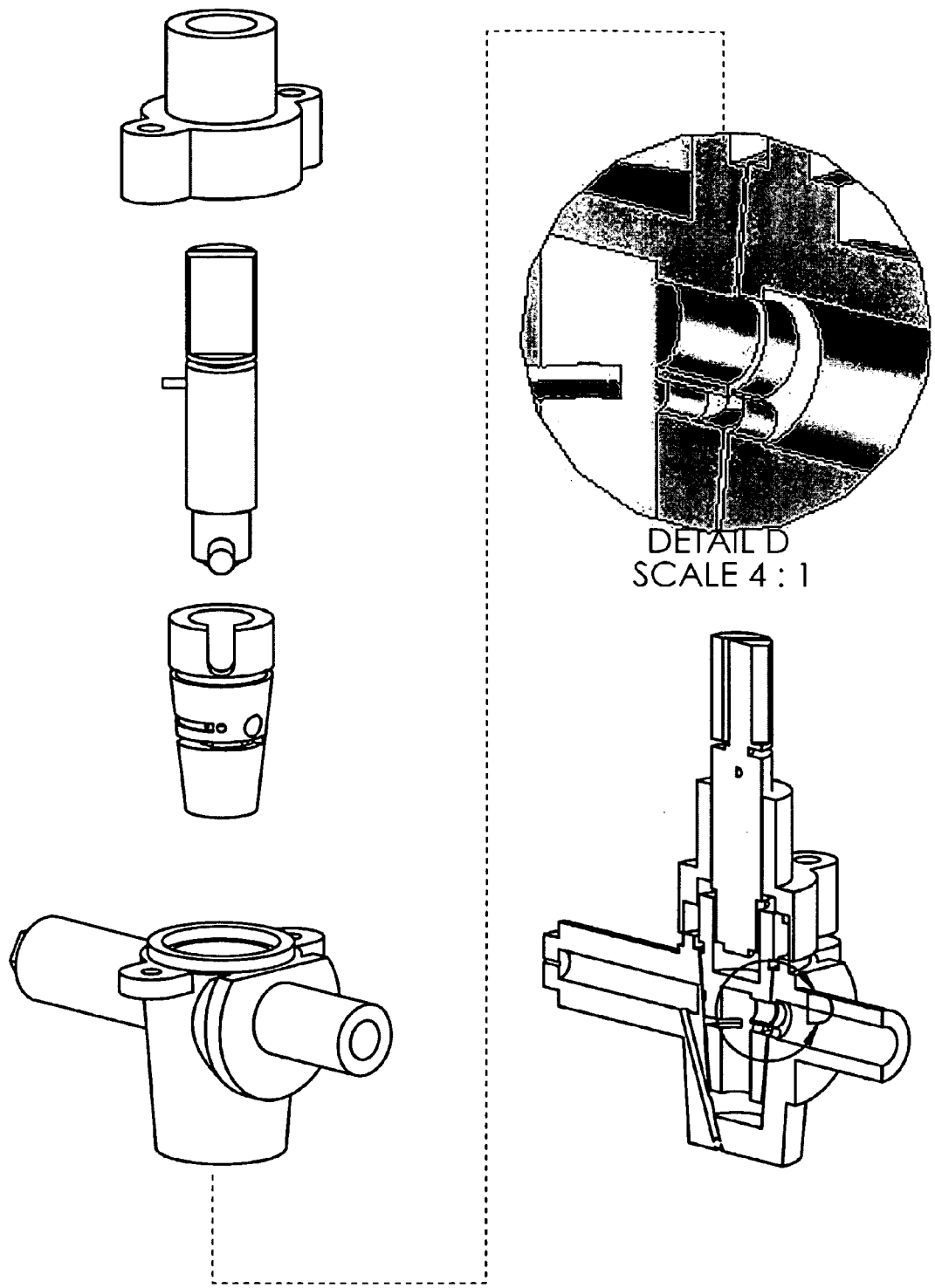
FIG. 3 is an exploded view of the same with the valve components aligned in the highest flow position.
Figure 4:
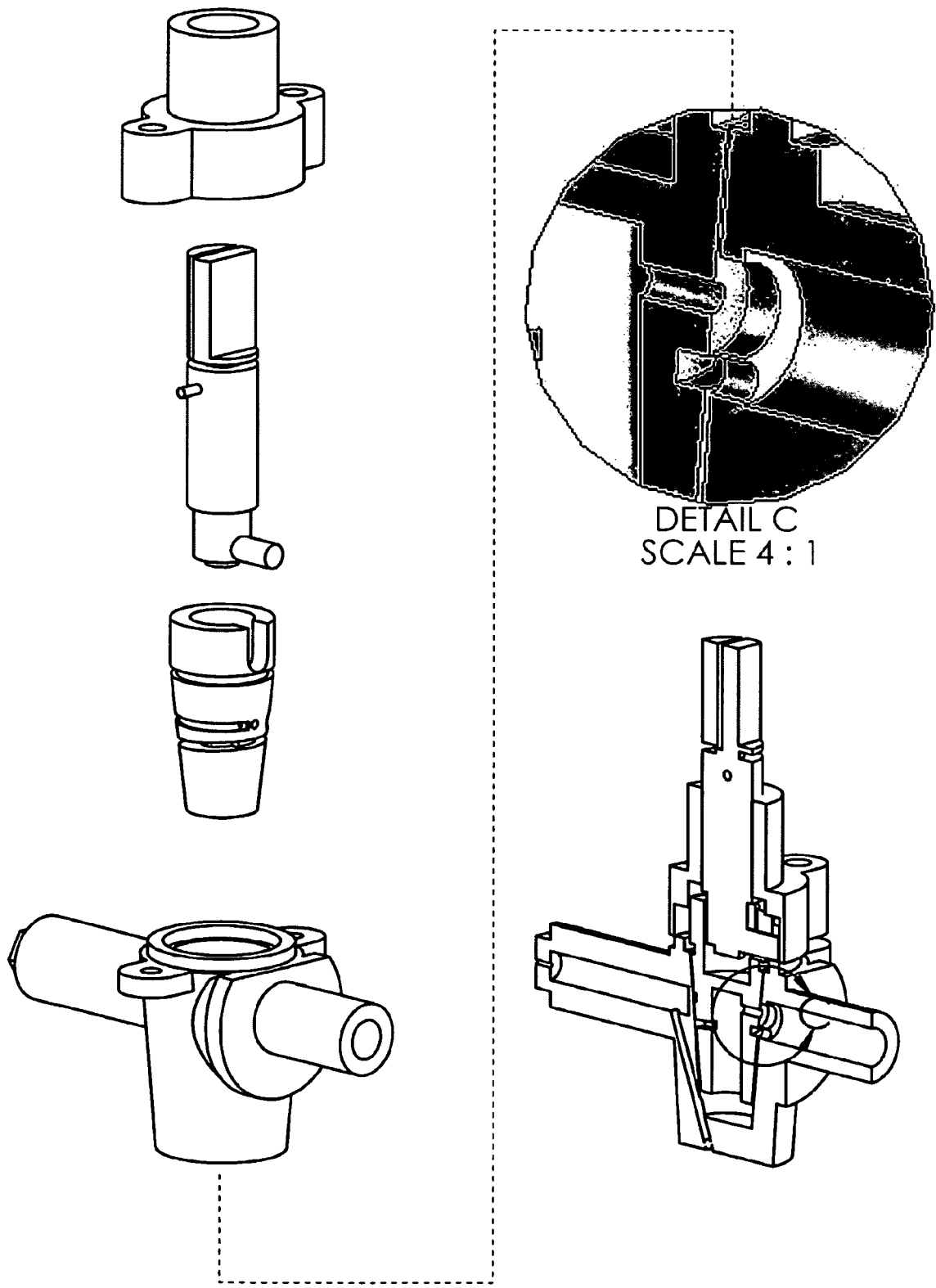
FIG. 4 is an exploded view of the same with the valve components aligned in the high flow position.
Figure 5:
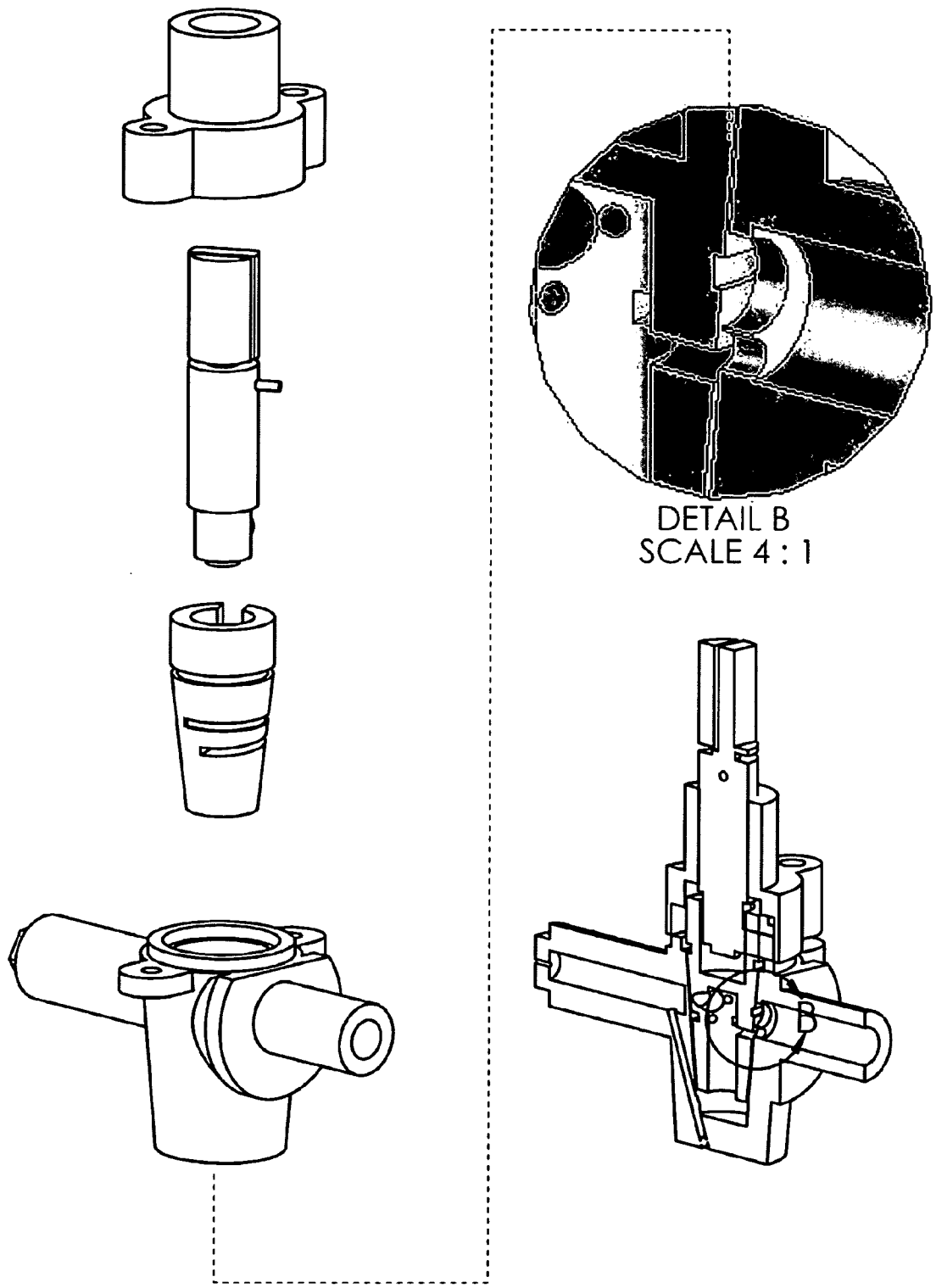
FIG. 5 is an exploded view of the same with the valve components aligned in the medium flow position.
Figure 6:
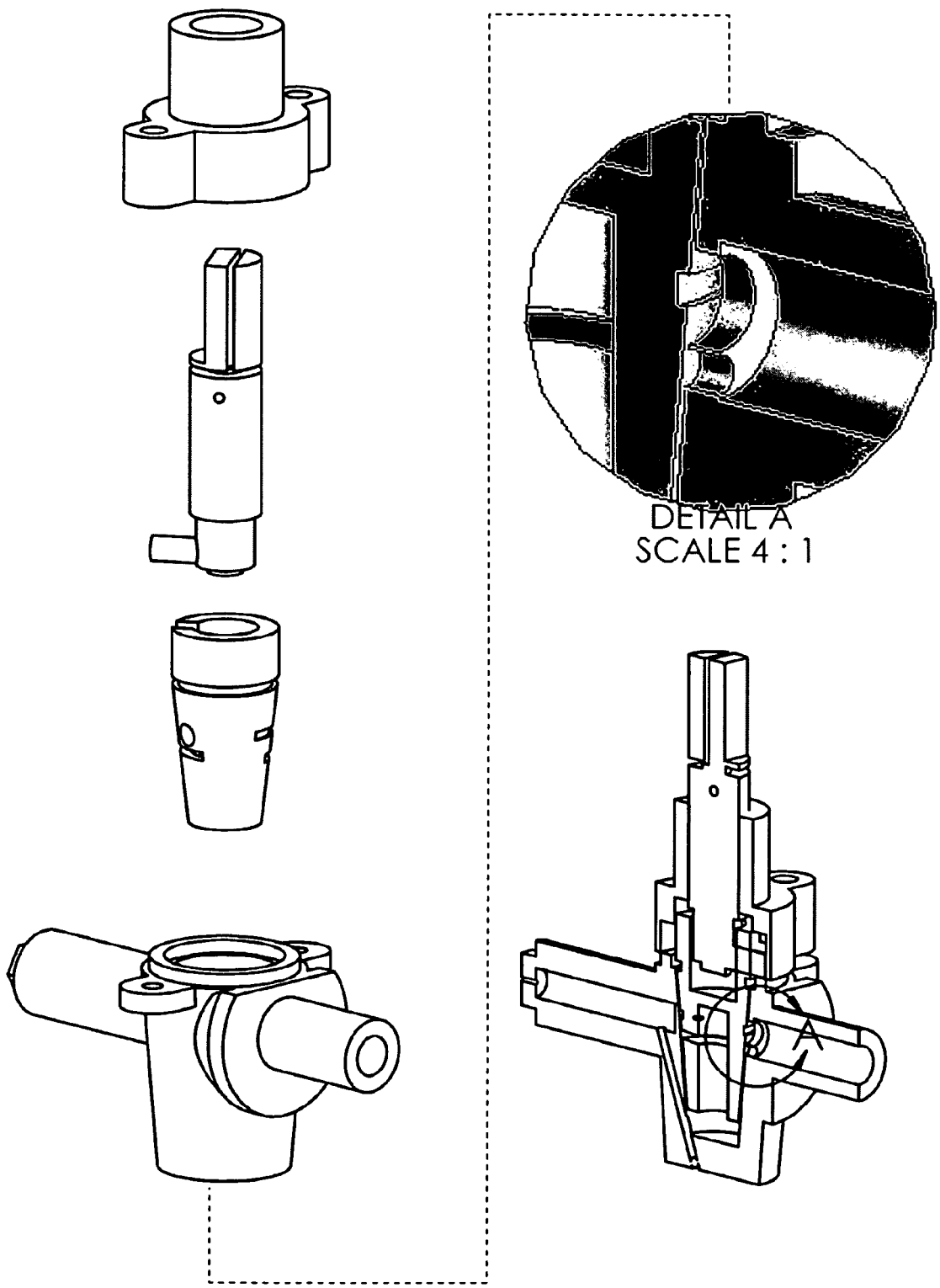
FIG. 6 is an exploded view of the same with the valve components aligned in the low flow position.

Each of FIGS. 2-6 corresponds to a different position or setting of the valve, ranging from an off position in FIG. 2, to the highest flow position in FIG. 3, to the high flow position in FIG. 4, to the medium flow position in FIG. 5, and, finally, to the low flow position end in FIG. 6. Accordingly, the valve has a plurality of settings or positions. It has a highest, or maximum flow, setting and a low, or lowest, flow setting. Additionally, the valve has intermediate flow settings, including the high flow setting and the medium flow setting. Although the valve has four distinctly identified positions, it is contemplated that a valve could have more or fewer positions.

FIGS. 2-6 correspond with the consecutive positions or settings of the valve. In other words, the valve can only be rotated in one direction from the off position. As shown, that direction is counterclockwise, although it is contemplated that the direction could be clockwise. When the valve is rotated from the off position, the first position arrived at is the highest flow position. Accordingly, the highest flow position is the nearest adjacent position from the off setting. Thereafter, the next adjacent position is the high flow position. The next adjacent position is the medium flow position and finally the low flow position. It is contemplated that the valve could be adapted such that the next adjacent position to the off setting is the low flow position rather than the highest flow position. Even further, the valve could be adapted to be rotated in both directions, whereby the user could, by rotating in a first direction from the off position, arrive at the highest flow setting, or by rotating in a second direction from the off position, arrive at the low flow position. Even further, it is contemplated that the positions can be provided in any order. For example, the high position could be the first flow position, followed by the medium flow position, then the low flow position, and finally the highest flow position.

As can be ascertained from FIGS. 2 and 3, the angular offset between the off position in FIG. 2 and the highest flow position in FIG. 3 is approximately 45°. Although the shown angular offset between the off position and the highest flow position is approximately 45°, it is contemplated that such angular offset can vary, so long as the angular offset is less than the 90° offset of the prior art. As can be ascertained from FIGS. 2 through 6, the angular offset between the off position in FIG. 2 and the high flow position in FIG. 4 is approximately 90° and the angular offset between the highest flow position in FIG. 3 and the high flow position in FIG. 4 is approximately 45°. It is contemplated that the angular offset for these settings can vary as well.

Figure 7:
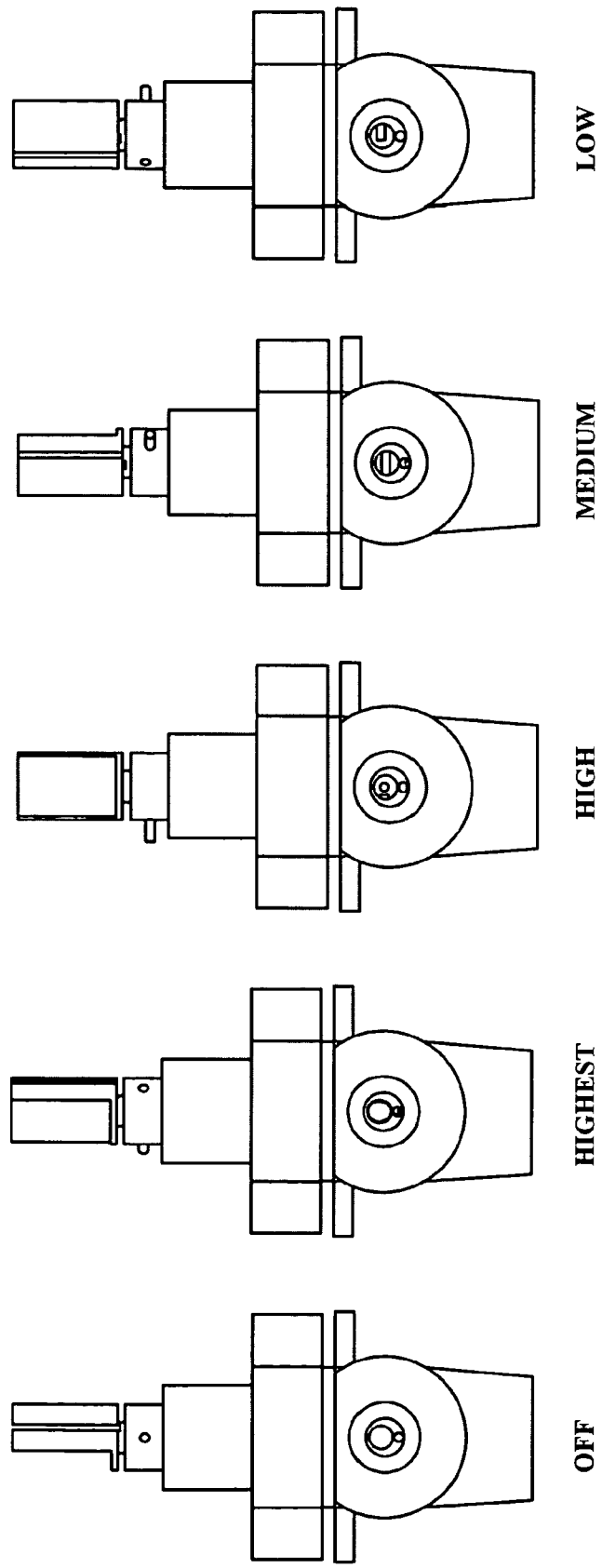
FIG. 7 provides five end views of the same with valve components aligned in all of the five defined positions.

Referring now to FIG. 7, end-views of the valve are shown to describe the available flow area through the ports 24 and 26 at the inlet 22 of the valve 10. Each end-view is labeled to indicate the position—i.e. off, highest flow, high flow, medium flow, or low flow—of the valve stem 80 and the valve plug 60. The shaded portion in each end-view represents the available flow area through the port at each position or setting.

Figure 8:
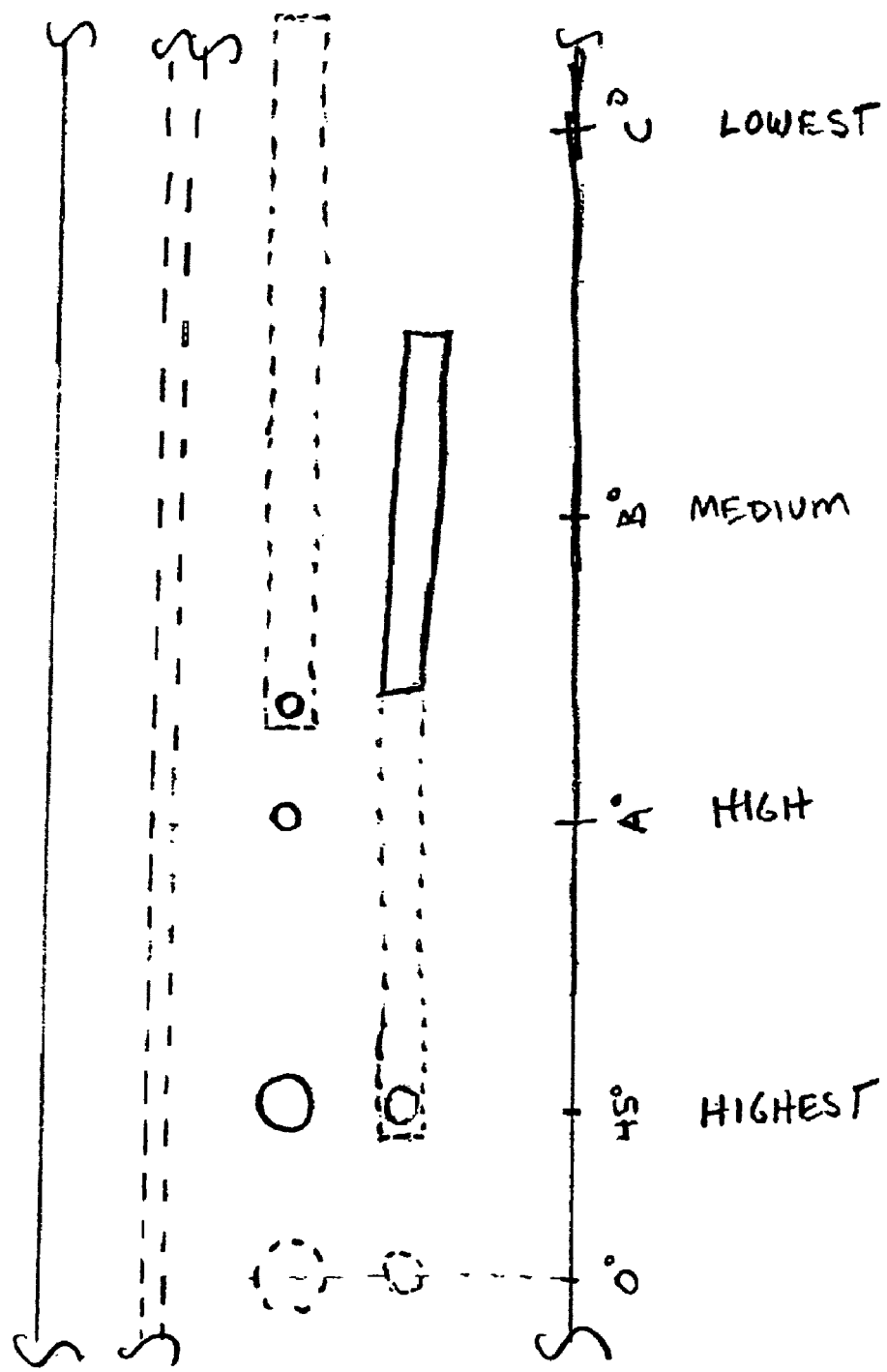
FIG. 8 is an "unfolded" view from the inside of the valve plug showing the overlap between the flow restrictor and the valve inlet ports when the valve plug is aligned in the off position.
Figure 9:
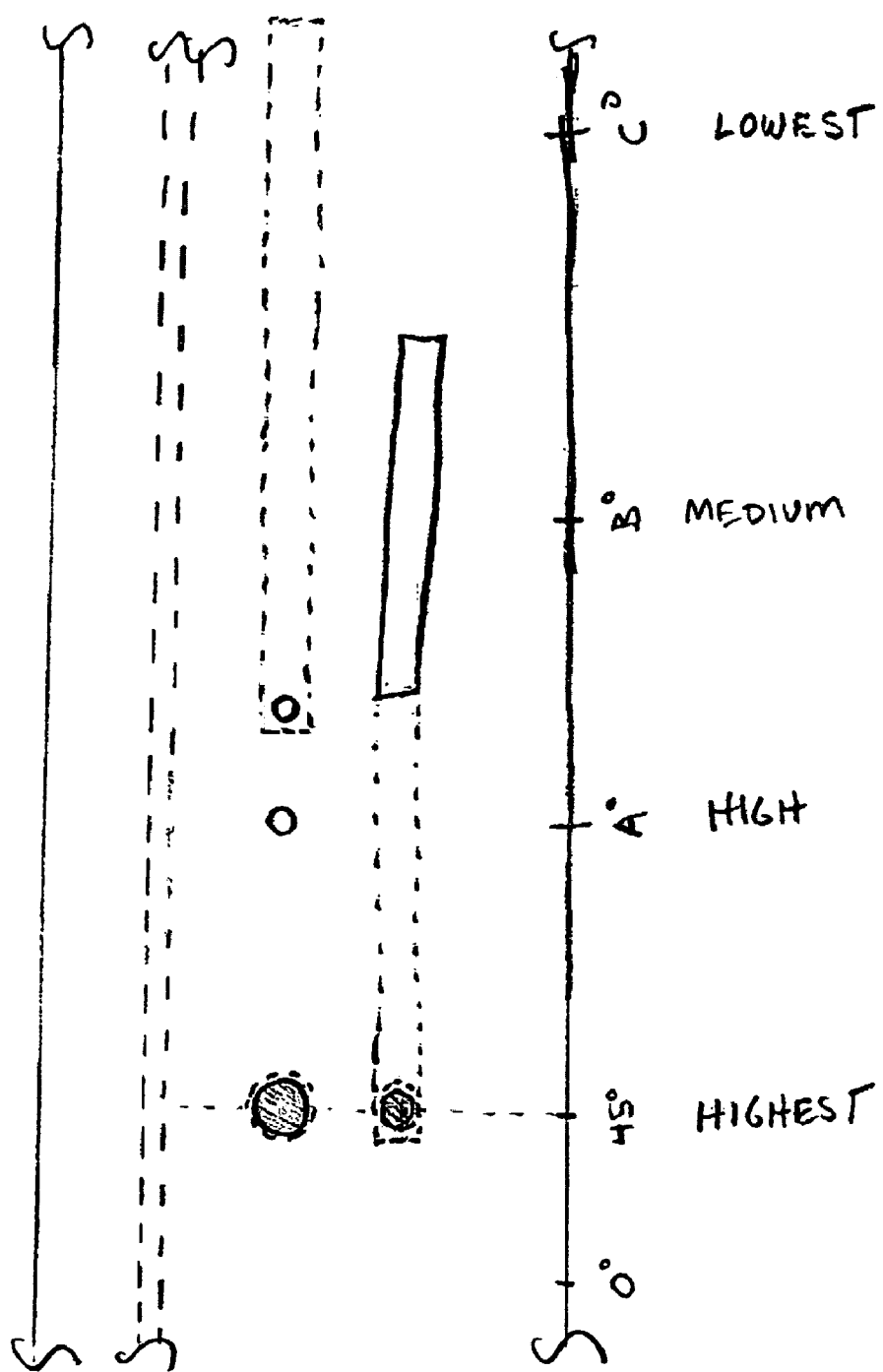
FIG. 9 is an "unfolded" view from the inside of the same showing the overlap between the flow restrictor and the valve inlet ports when the valve plug is aligned in the highest flow position.
Figure 10:
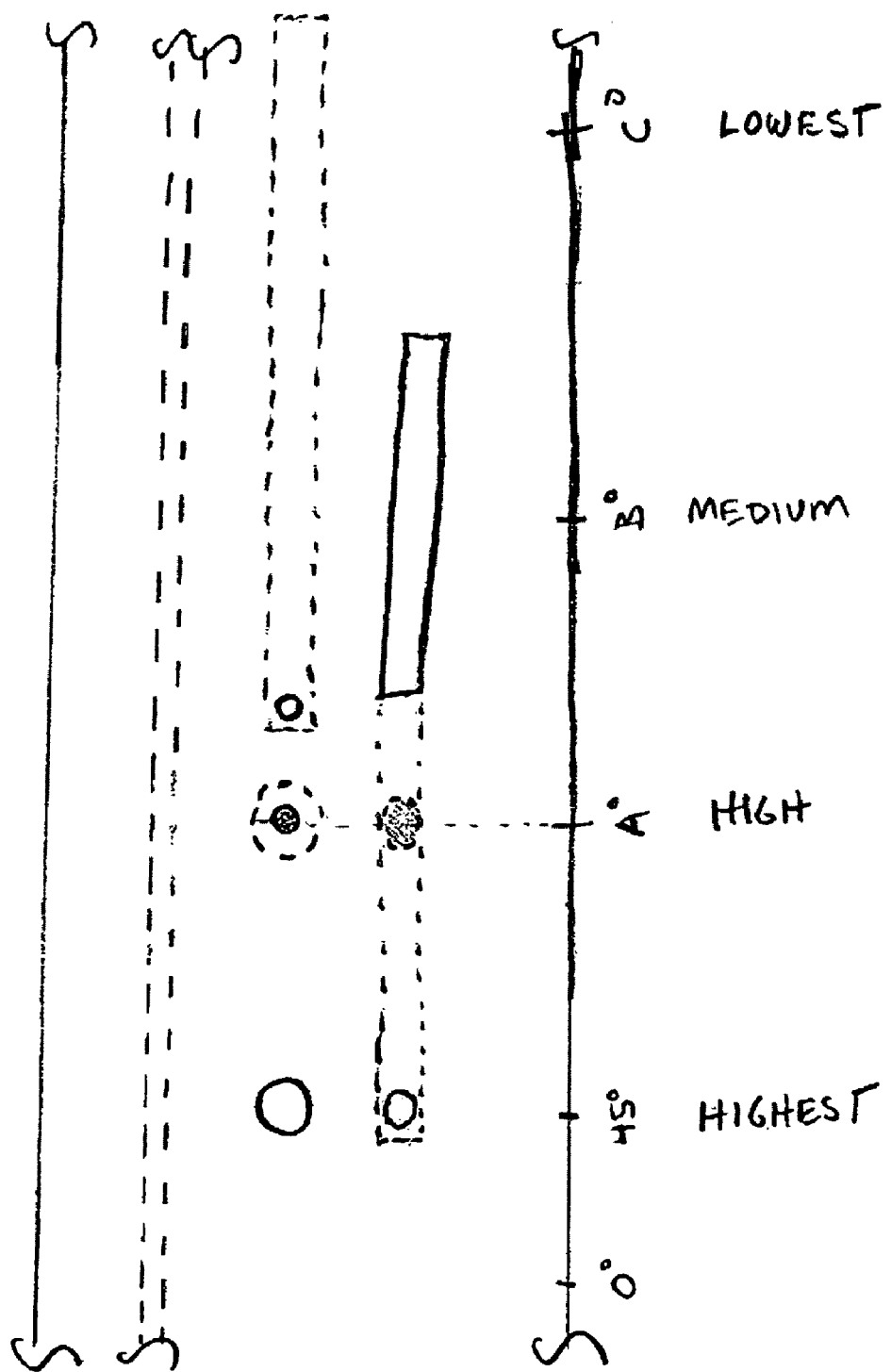
FIG. 10 is an "unfolded" view from the inside of the same showing the overlap between the flow restrictor and the valve inlet ports when the valve plug is aligned in the high flow position.
Figure 11:
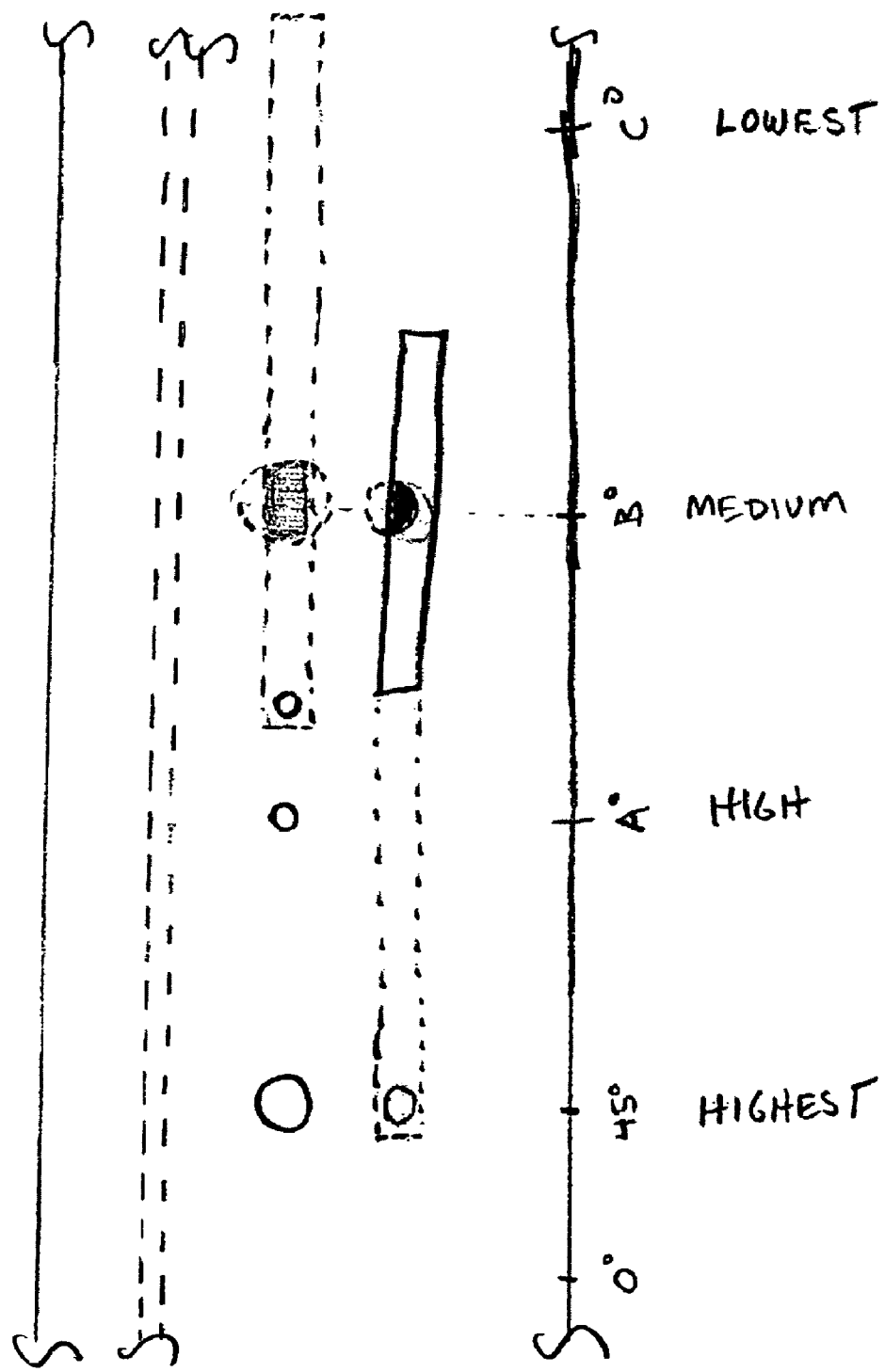
FIG. 11 is an "unfolded" view from the inside of the same showing the overlap between the flow restrictor and the valve inlet ports when the valve plug is aligned in the medium flow position.
Figure 12:
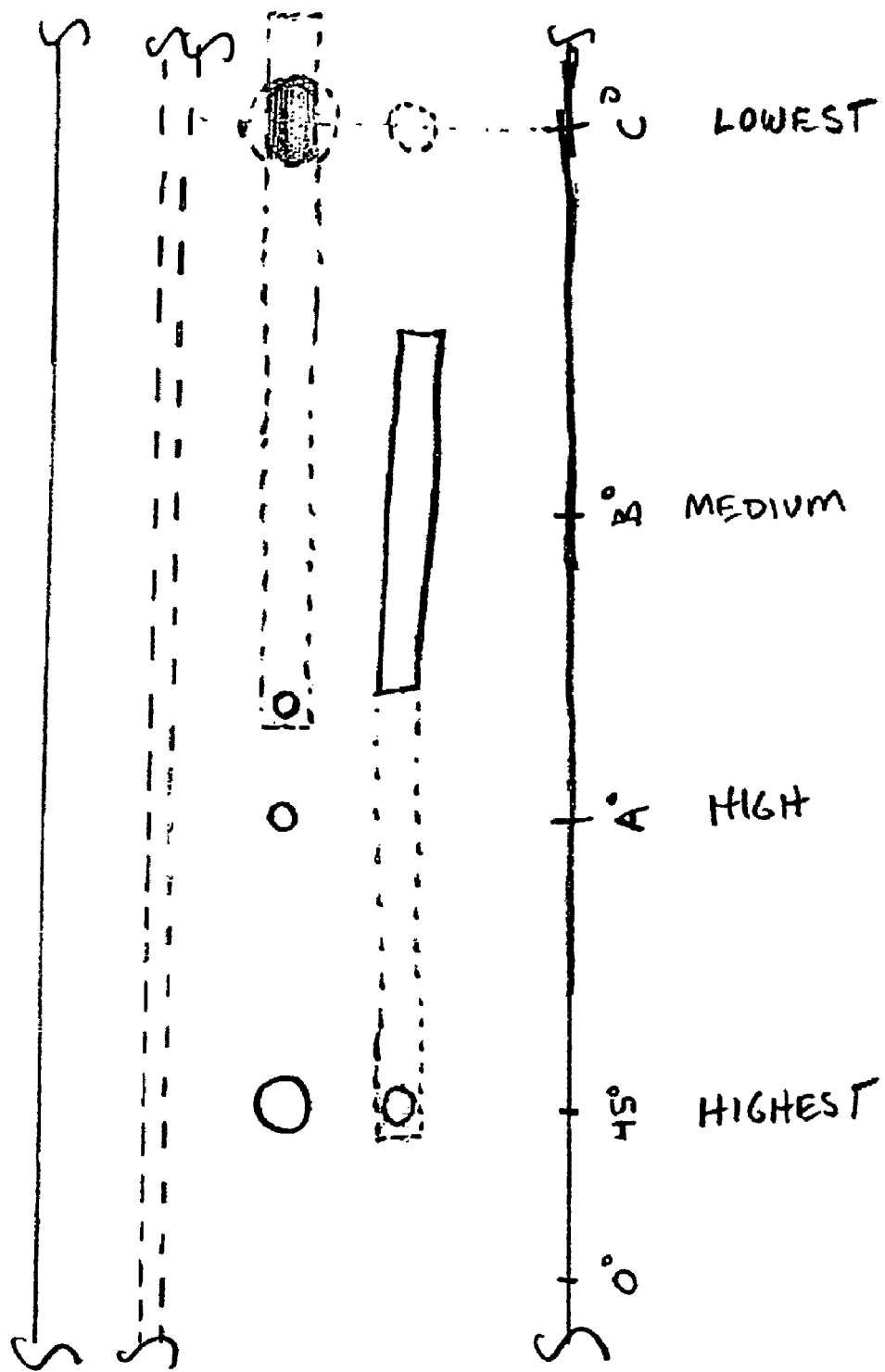
FIG. 12 is an "unfolded" view from the inside of the same showing the overlap between the flow restrictor and the valve inlet ports when the valve plug is aligned in the low flow position.

Turning now to FIGS. 8 through 12, "unfolded" views from the inside of the valve plug is provided to describe the location and overlap of the flow regulator 61 with the inlet ports 24 and 26 at various positions. FIG. 8 represents the off position, and corresponds with FIG. 2. FIG. 9 represents the highest flow position, and corresponds with FIG. 3. FIG. 10 represents the high flow position, and corresponds with FIG. 4. FIG. 11 represents the medium flow position, and corresponds with FIG. 5. Finally, FIG. 12 represents the low flow position, and corresponds with FIG. 6. As in FIG. 7, the available flow area through the ports 24 and 26 are shaded.

FIG. 8 through 12 best depict the profile of the flow regulator 61. In general, the flow restrictor 61 comprises of a number of channels (including holes and grooves) which are adapted to interact with the ports 24 and 26 at the inlet 22 of the valve body 20. In particular, the flow restrictor 61 comprises two rows of channels and/or holes, the first, or top, row of which is adapted to align with the first port 24 and the second, or bottom, row of which is adapted to align with the second port 26.

In the first, or top, row of the flow restrictor 61, there is a first hole 62, a second hole 68, a third hole 70, and a first groove 72. The first hole 62 is a through-hole, in that it extends completely through the outside wall 63 of the valve plug 60. Further, the first hole 62 has a diameter which is approximately equal to (or corresponds to) the first port 24, and is aligned at the highest flow position, which is approximately 45° offset from the off position. The second hole 68 also is a through-hole, is aligned at the highest flow position, which is approximately 90° offset from the off position. The first groove 72 extends for a portion of the circumference of the valve plug 60, and is slightly offset from the high flow position (towards the medium flow position) and extends to or slightly past the low flow position. The first groove 72 does not extend all of the way through the outside wall 63 of the valve plug. Indeed, any flow entering the first groove 72 travels to the center of the plug through the third hole 70. As such, when the valve 10 is in the low flow position (see, in particular, FIG. 12), the flow entering the first groove 72 must travel circumferentially through the first groove 72 (to the left, in the Figure) first before traveling through the hole 70 into the center of the plug 60. The third hole 70 is aligned in the groove 72, between the high flow position and the medium flow position.

In the second, or bottom, row of the flow restrictor 61, there is a fourth hole 66 and a second groove 64. A first portion of the second groove 64 does not extend all of the way through the outside wall 63 of the valve plug (denoted by dashed lines in FIGS. 8-12) and a second portion of the second groove 64 is a through-hole (denoted by solid lines in FIGS. 8-12). The first portion of the second groove 64 is generally horizontal, while second portion of the second groove 64 angles slightly downward. The fourth hole 66 is disposed in the first portion of the second groove 64, has a diameter which corresponds to the second port 26 and is aligned with the highest flow position, which is approximately 45° offset from the off position. Because there are through holes at both the first portion and second portion of the second groove 64, it is believed that flow will travel circumferentially in both directions (towards the first portion and the second portion) when the valve is set to the high flow position (see, in particular, FIG. 10).

The particular dimensions of the orifice, channels, ports and holes described herein can vary depending upon a number of design factors, such as the quantity of valves per grill, the size of the cooking chamber, whether the cooking chamber is insulated, etc. However, once such design considerations are decided, one of skill in the art would how to select the particular configuration and dimensions of the valve.

Figure 13:
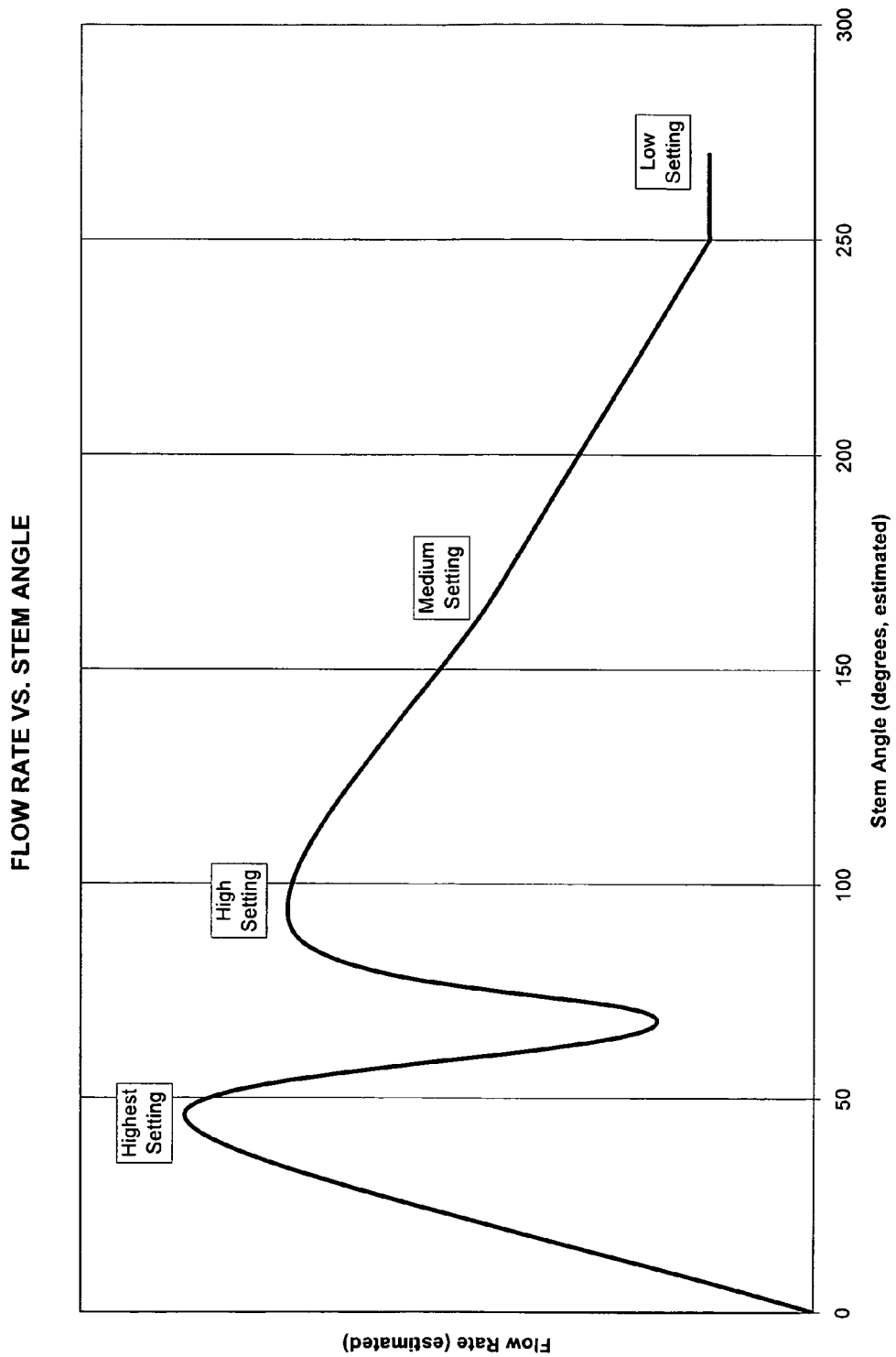
FIG. 13 is a graph showing the estimated flow rate of an embodiment of the valve at various alignments of the valve plug.

Turning now to FIG. 13, the estimated flow characteristics of the valve 10 is shown. The values represented by the curve are an estimate only, and as such are not based on any testing or mathematical formulations. It is believed that the highest flow setting have a flow rate which is approximately 120% to 130% of the flow rate of the high flow setting. The high flow setting is intended to have a flow rate which is approximately equal to the maximum flow rate of a typical valve of the prior art. It is intended that the flow characteristics be generally linear between the high flow setting and the low flow setting. As shown and based on the profile of the flow restrictor, it is believed that there will be a slight dip in the flow rate between the highest flow setting and the high flow setting. This dip could be avoided by changing the profile of the flow restrictor 61.

Figure 14:
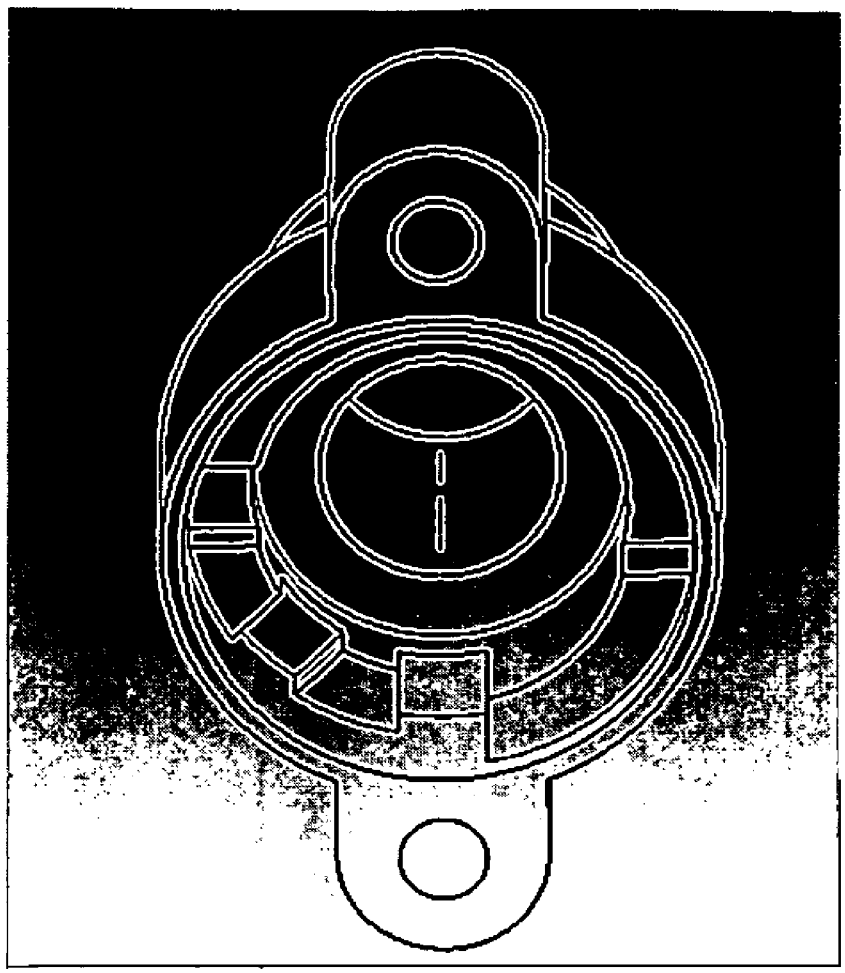
FIG. 14 is an underside view of the valve cap showing the detents which are used to create positive settings for the valve plug.

Turning now to FIG. 14, the underside of the valve cap 40 is shown. The underside of the cap 40 includes a plurality of detents and/or stops for engaging with the valve stem 80 (or a projection from the valve stem—i.e. the indexing rod 82). The shown embodiment of the valve includes a first detent 42, which is adapted to engage with the indexing rod 82 when the valve plug 60 is aligned in the off position; a second detent 44, which is adapted to engage with the indexing rod 82 when the valve plug 60 is aligned in the highest flow position; a third detent 46, which is adapted to engage with the indexing rod 82 when the valve plug 60 is aligned in the high flow position; and a stop 48, which is adapted to engage with the indexing rod 82 when the valve plug 60 is aligned in the low flow position to prevent further rotation of the valve stem 80.

Figure 15:
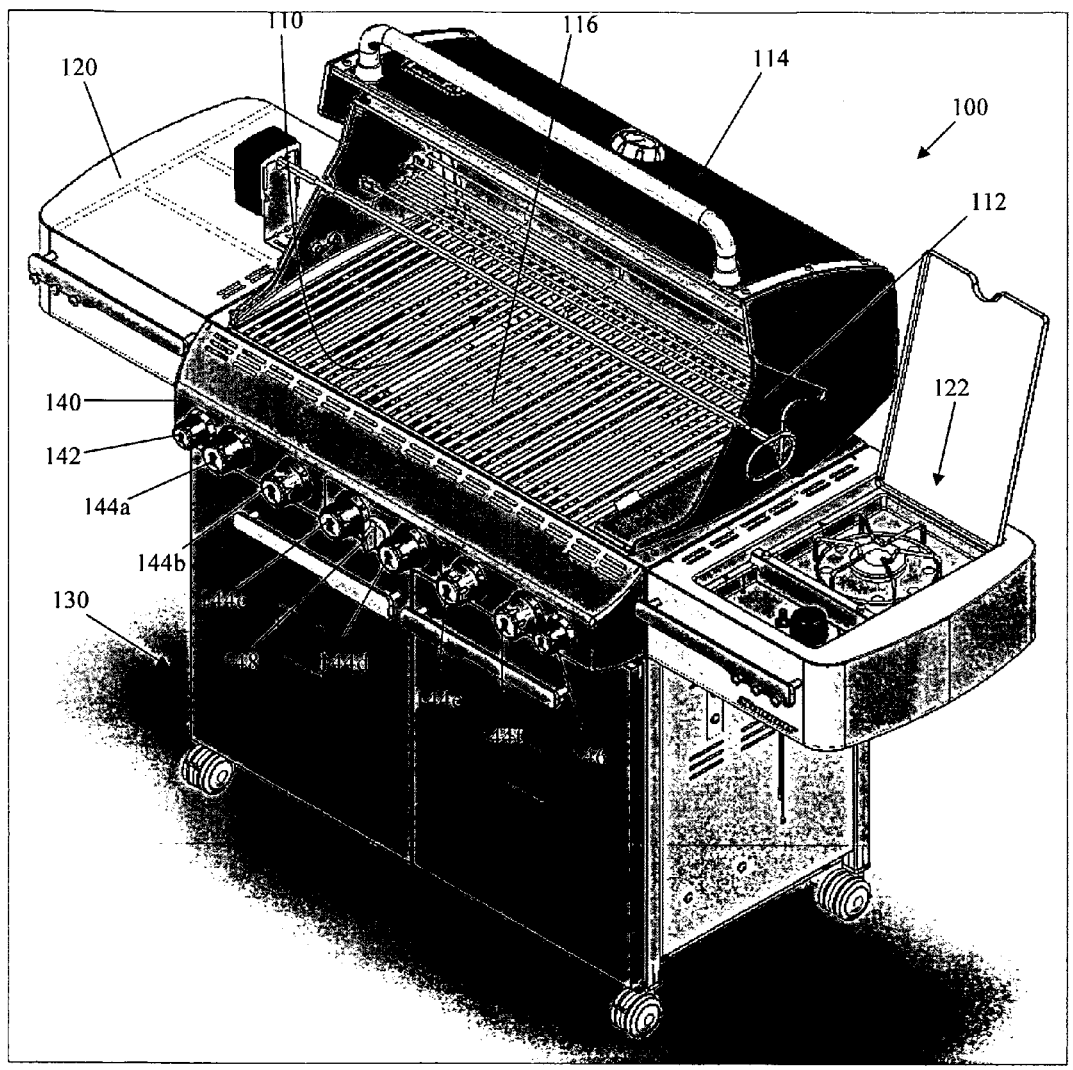
FIG. 15 is a perspective view of an embodiment of a barbecue grill incorporating a multi-use sear zone.
Figure 16:
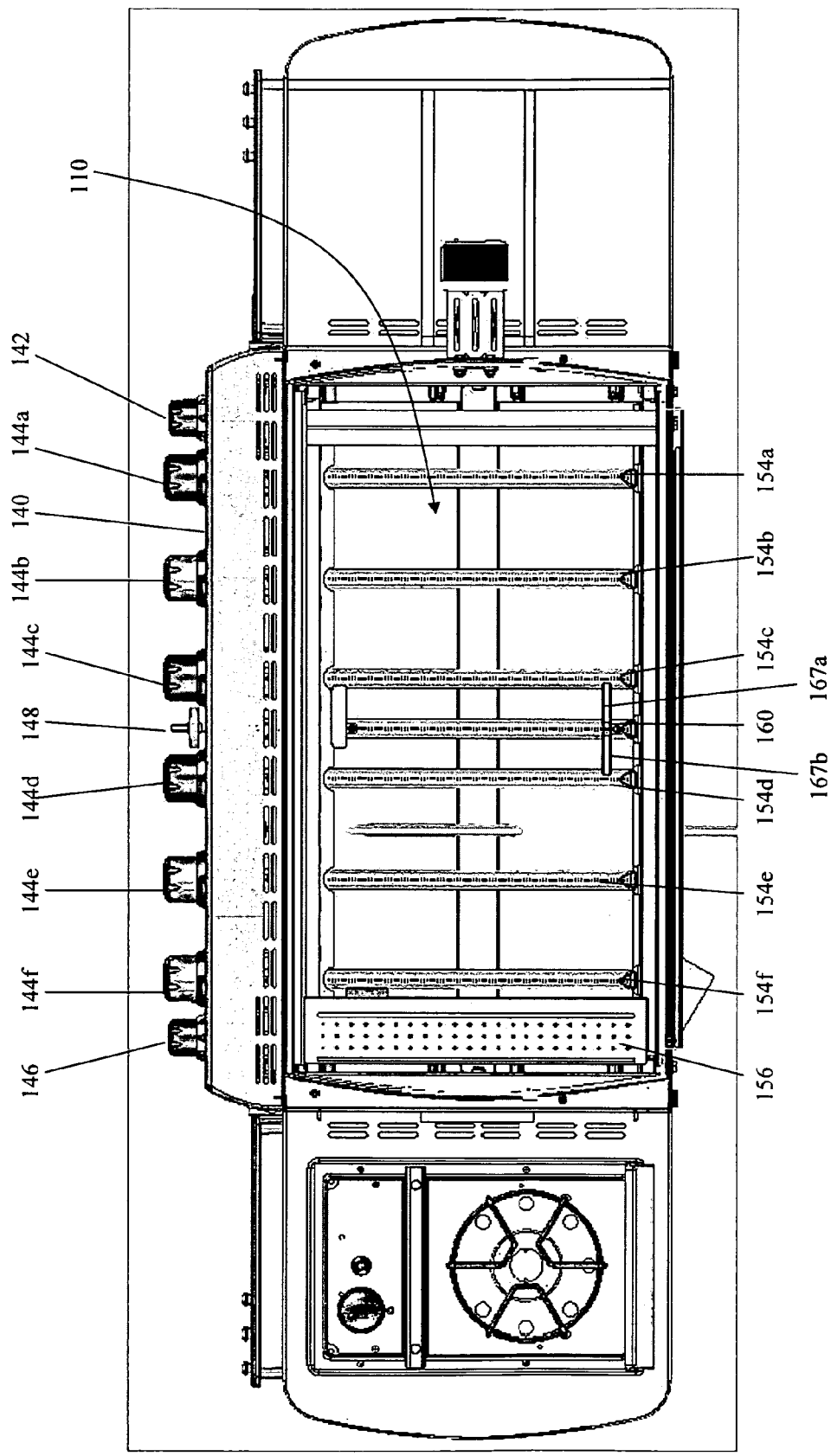
FIG. 16 is a top view of the barbecue grill which incorporates a first embodiment of a sear-zone burner tube.

Referring now to FIGS. 15 and 16, a barbecue grill 100 is shown which includes a supplementary burner tube 160 which is adapted to convert a portion of the cooking surface 116 into a multi-use cooking zone. When the supplementary burner tube is on, the cooking surface 116 which is generally above the supplementary burner tube 160 can be used for searing of foods. When the supplementary burner tube is off, or on a low setting, the cooking surface 116 which is generally above the tube 160 can be used for conventional cooking of foods.

The barbecue grill 100 includes many features which are common to modern barbecue grills. For example, the grill includes a support frame assembly or cart 130 for supporting a cooking chamber, which is comprised of a firebox 112 and a lid 114. Although some embodiments of the grill 100 would not include a lid 114, in the shown embodiment, the firebox 112 and the lid 114 collectively define a cooking chamber 1 10. The grill 100 also includes side shelves 120, one of which includes a side burner assembly 122, and a control panel 140. While the control panel 140 is shown disposed at a front side of the grill, beneath the cooking chamber, it is contemplated that the control panel 140 could be disposed at other locations, such as on one of the side shelves 120. The control panel 140 includes a plurality of control knobs for the barbecue grill. For example, there is a rotisserie burner control knob 142 which controls an IR burner (not shown) which located near a rear side of the cooking chamber, above the warming rack. There are also standard burner control knobs 144*a*, 144*b*, 144*c*, 144*d*, 144*e* and 144*f*, which are interconnected with a control valve (not shown) and standard burner tubes, 154*a*, 154*b*, 154*c*, 154*d*, 154*e*, and 154*f*. Even further, there is a smoker box control knob 146 which controls a burner for the smoker box 156. Finally, there is a supplementary burner control knob 148, which is interconnected with a control valve (not shown) and a supplementary burner tube 160.

The supplementary burner tube 160 is adapted to sit adjacent to at least one standard burner tube 154 to supplement the normal heat output of the grill, thereby making it possible for the grill to produce the intense heat required for searing food. In the embodiment best shown in FIG. 16, the supplementary burner tube 160 is disposed between two adjacent burner tubes 154*c*, 154*d*, thereby converting the central portion of the barbecue grill into a multi-use cooking zone.

Figure 17:
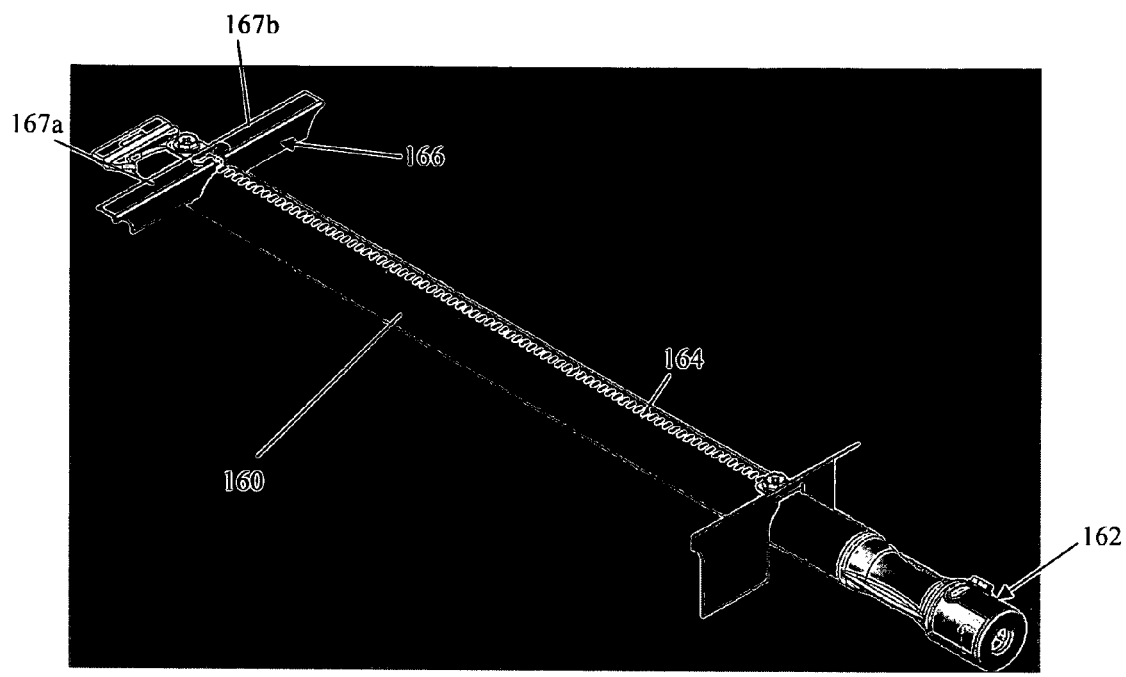
FIG. 17 is a perspective view of the first embodiment of the sear-zone burner tube.
Figure 18:
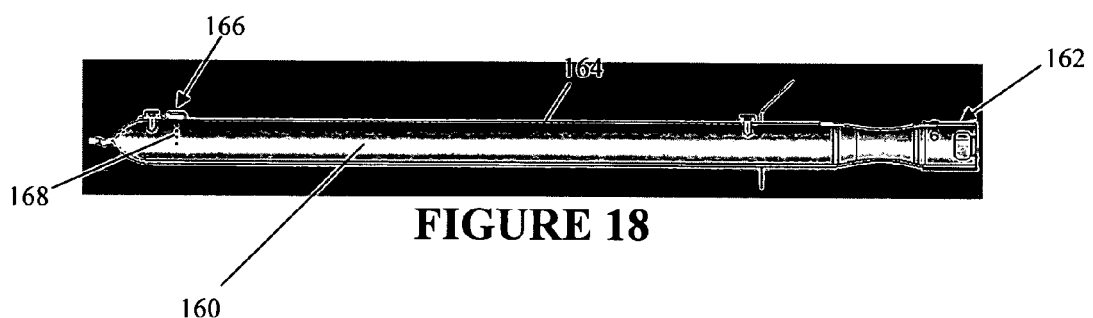
FIG. 18 is a cross-sectional view of the same.

A first embodiment of the supplementary burner tube 160 is depicted in FIGS. 17 and 18. The burner tube 160 includes a flange portion 162 for engaging with a valve, and a plurality of orifices 164 along its length for distributing the fuel source. The burner tube 160 also includes a cross-ignition member 166 which includes a first cup member 167*a* which extends transverse to the burner tube 160 and a second cup member 167*b* which also extends transverse to the burner tube 160, although in an opposite direction. Referring back to FIG. 16, the cup members 167*a*, 167*b* extend towards the adjacent standard burners 154c, 154d and are in close proximity thereto. The cup members 167a, 167b may rest on top of the adjacent burners 154c, 154d to provide support for the supplementary burner tube. As better shown in FIG. 18, the burner tube 160 includes a second set of orifices 168 which are aligned circumferentially, underneath the cup members 167a, 167b. In this manner, ignition gas is provided to the cup members 167a, 167b which direct the ignition gas to the adjacent burners 154c, 154d, whereby the supplementary burner tube 160 utilizes an existing flame from the adjacent burners 154c, 154d for ignition.

Figure 19:
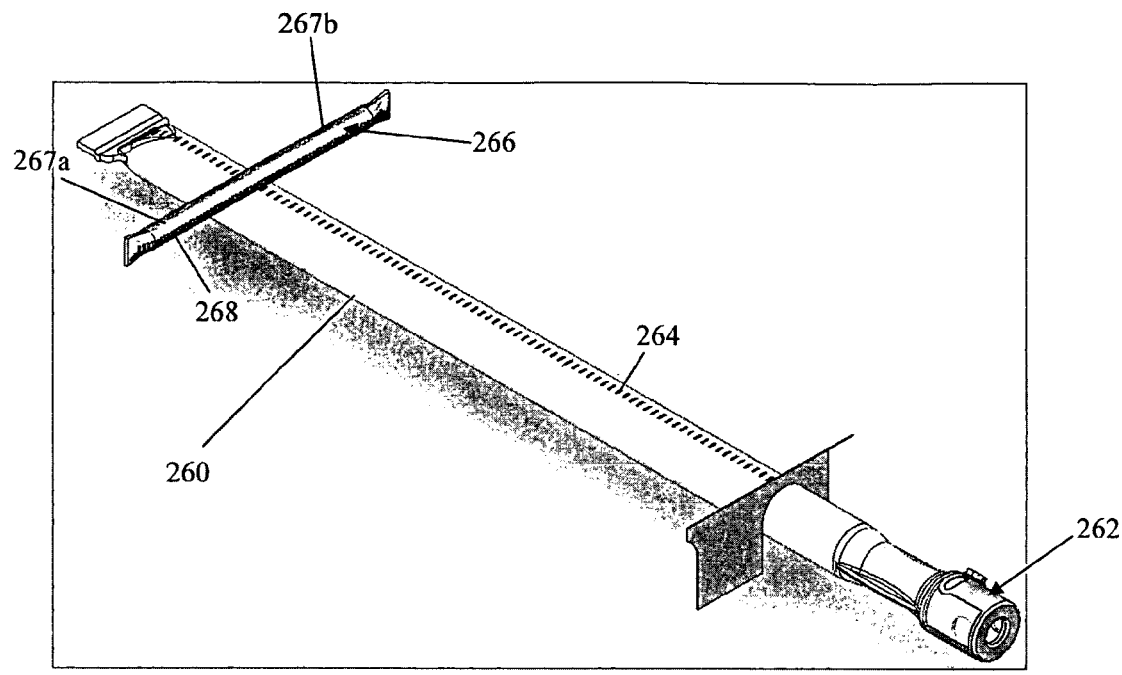
FIG. 19 is a perspective view of a second embodiment of the sear-zone burner tube.
Figure 20:
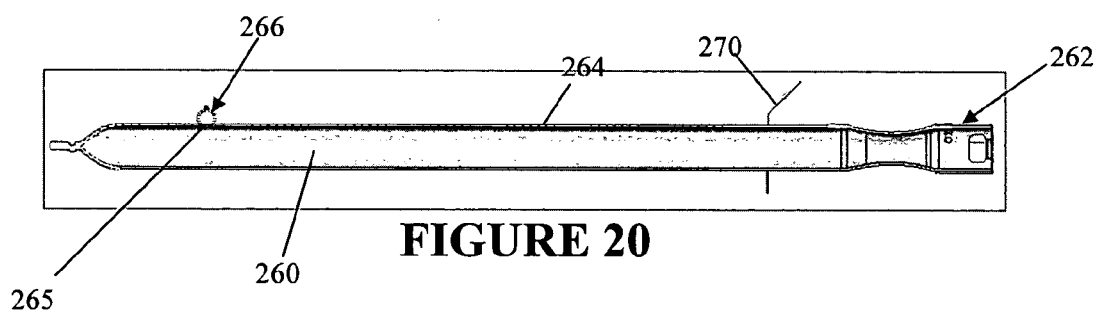
FIG. 20 is a cross-sectional view of the same.

A second embodiment of the supplementary burner tube 260 is depicted in FIGS. 19 and 20. The burner tube 260 includes a flange portion 262 for engaging with a valve, and a plurality of orifices 264 along its length for distributing the fuel source. The burner tube 260 also includes a cross-ignition tube member 266 which is aligned transverse to the burner tube 260. The tube member 266 is configured to communicate with the burner tube 260 through an aperture 265. The tube member 266 has a first length 267a which extends transverse to the burner tube 260 towards an adjacent standard burner tube and a second length 267b which also extends transverse to the burner tube 160, although in an opposite direction towards a second adjacent standard burner tube. Like the cup members 167a, 167b of the first embodiment, the lengths 267a, 267b extend towards the adjacent standard burners 154c, 154d and are in close proximity thereto. As better shown in FIG. 19, the burner tube 266 includes a set of orifices 268 along the lengths 267a, 267b. In this manner, ignition gas is directed towards the adjacent burners 154c, 154d, whereby the supplementary burner tube 260 utilizes an existing flame from the adjacent burners 154c, 154d for ignition.

Although both shown embodiments of the supplementary burner tube 160, 260 are straight tubes, it is contemplated that the supplementary burner tube could be curvilinear or could include multiple parallel portions.

Figure 21:
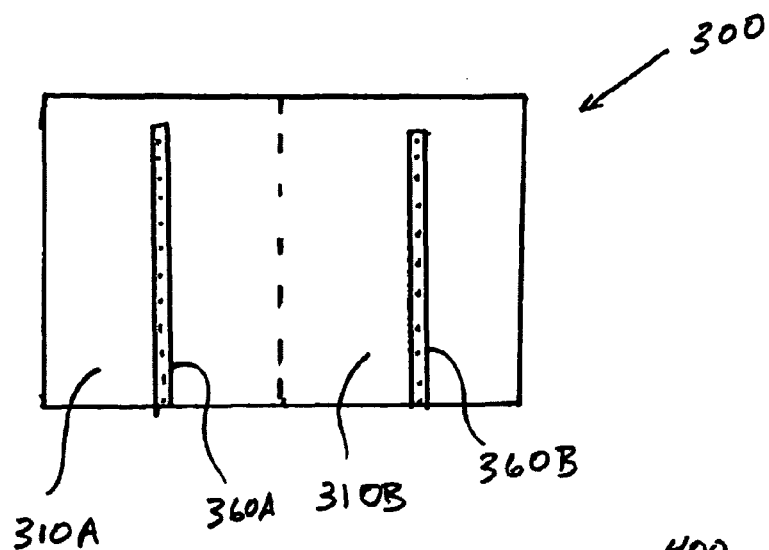
FIG. 21 is a schematic top view of a first version of a barbecue grill which includes a multi-use cooking zone.
Figure 22:
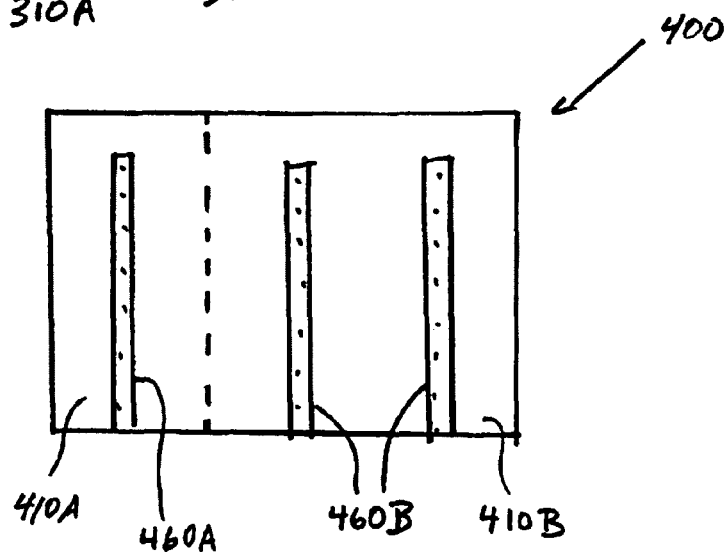
FIG. 22 is a schematic top view of a second version of a barbecue grill which includes a multi-use cooking zone; and, FIG. 23 is a schematic top view of a third version of a barbecue grill which includes a multi-use cooking zone.
Figure 23:
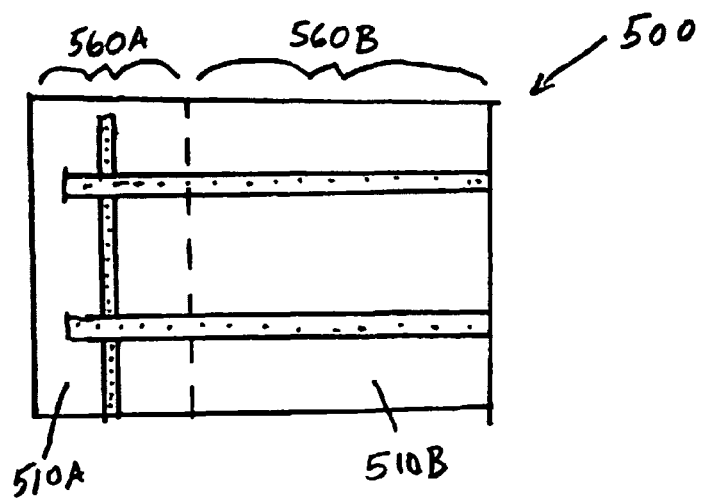

At least some of the embodiments of the high capacity valve and the supplementary burner tube described above can be used to convert at least a portion of a barbecue grill cooking surface into a multi-use cooking zone, which can be used for searing of foods and for conventional cooking. For example, FIGS. 21-23 schematically show three different versions of a two-zone barbecue grill 300, 400, 500, wherein the cooking chamber of the grill comprises zone A 310A, 410A, 510A and zone B 310B, 410B, 510B. Each of the zones include a heat source 360A, 460A, 560A and 360B, 460B, 560B. In FIGS. 21 and 22, each of the heat sources is graphically depicted as a single burner tube. However, it is contemplated that the heat source 360A, 460A, 560A and 360B, 460B, 560B could include more than one such component and could be any other type of heat source other than a burner tube. Moreover, it is contemplated that a single burner tube could pass through more than one zone, wherein a first portion of the burner tube would contribute to the heat source 360A, 460A, 560A and the second portion of the burner tube would contribute to the heat source 360B, 460B, 560B, like in FIG. 23.

In FIG. 21, both zone A 310A and zone B 310B are approximately the same size, whereby the cooking surface area in zone A 310A is approximately the same size at the cooking surface area in zone B 310B. When all of the heat sources 360A in zone A 310A are placed in their highest setting, the heat source 360A produces a heat output $H_{A,HST}$. When all of the heat sources 360B in zone B 310B are placed in their highest setting, the heat source 360B produces a heat output $H_{B,HIGHEST}$. However, zone A is adapted to be used for searing of foods, whereby heat output in zone A at the highest setting is significantly greater than the output in zone B ($H_{A,HIGHEST} \gg H_{B,HIGHEST}$). In one embodiment, the heat output in zone A is approximately 120% of the heat output in zone B ($H_{A,HIGHEST} \approx 1.2 \times H_{B,HIGHEST}$). In another embodiment, the heat output in zone A is between 110% and 130% of the heat output in zone B. In yet another embodiment, the heat output in zone A is greater than 130% of the heat output in zone B. In another embodiment, the heat output in zone A is greater than 100% of the heat output in zone B.

Zone A in FIG. 21 is also configured for normal cooking of food, whereby the heat output in Zone A can be adjusted to be equal to that produced in zone B, when the zone B heat sources 360B are placed in their high, medium and low settings. For example, when all of the heat sources 360B in zone B 310B are placed in their lowest setting, the heat source 360B produces a heat output $H_{B,LOW}$. When all of the heat sources 360B in zone B 310B are placed in their medium setting, the heat source 360B produces a heat output $H_{B,MEDIUM}$. When all of the heat sources 360B in zone B 310B are placed in their high setting, the heat source 360B produces a heat output $H_{B,HIGH}$ (which may be equal to $H_{B,HIGHEST}$, depending upon the configuration of the heat source 360B). The zone A heat source 360A can be adjusted such that the heat output in zone A 310A is approximately equal to the heat output in zone B 310B at all of those settings (i.e., $H_A \approx H_{B,LOW}$, $H_{B,MEDIUM}$, or $H_{B,HIGH}$). In the event that the zone A heat source 360A includes the valve and standard burner tube combination described above (and shown in FIGS. 1-14), the zone B 310B heat outputs can be matched by adjusting the valve to the low, medium, and high settings respectively. In the event that the zone A heat source 360 includes a supplementary sear-zone burner tube, like the ones described above and shown in FIGS. 15-20), the zone B 310B heat outputs can be matched by turning off the supplementary burner tube and adjusting the remaining standard burner tubes in zone A to the low, medium and high settings, respectively.

In FIG. 22, zone A 410A is smaller than zone B 410B, whereby the cooking surface area in zone A 410A is approximately the ½ the size of the cooking surface area in zone B 410B. When all of the heat sources 460A in zone A 410A are placed in their highest setting, the heat source 460A produces a heat intensity $I_{A,HIGHEST}$, which is equal to the heat output of heat source 460A divided by the area of the cooking surface in zone A 410A. When all of the heat sources 460B in zone B 410B are placed in their highest setting, the heat source 460B produces a heat intensity $I_{B,HIGHEST}$ which is equal to the heat output of heat source 460B divided by the area of the cooking surface in zone B 410B. Zone A is adapted to be used for searing of foods, whereby heat intensity in zone A at the highest setting is significantly greater than the output in zone B ($I_{A,HIGHEST} \gg I_{B,HIGHEST}$). In one embodiment, the heat intensity in zone A is approximately 120% of the heat intensity in zone B ($I_{A,HIGHEST} \approx 1.2 \times I_{B,HIGHEST}$). In another embodiment, the heat intensity in zone A is between 110% and 130% of the heat intensity in zone B. In yet another embodiment, the heat intensity in zone A is greater than 130% of the heat intensity in zone B. In another embodiment, the heat intensity in zone A is greater than 100% of the heat intensity in zone B.

Zone A in FIG. 22 is also configured for normal cooking of food, whereby the heat intensity in Zone A can be adjusted to be equal to that produced in zone B, when the zone B heat sources 460B are placed in their high, medium and low settings. For example, when all of the heat sources 460B in zone B 410B are placed in their lowest setting, the heat source 460B produces a heat intensity $I_{B,LOW}$. When all of the heat sources 460B in zone B 410B are placed in their medium setting, the heat source 460B produces a heat intensity $I_{B,MEDIUM}$. When all of the heat sources 460B in zone B 410B are placed in their high setting, the heat source 460B produces a heat output $I_{B,HIGH}$ (which may be equal to $I_{B,HIGHEST}$, depending upon the configuration of the heat source 460B). The zone A heat source 460A can be adjusted such that the heat intensity in zone A 410A is approximately equal to the heat intensity in zone B 410B at all of those settings (i.e., $I_A \approx I_{B,LOW}$, $I_{B,MEDIUM}$, or $I_{B,HIGH}$). In the event that the zone A heat source 460A includes the valve and standard burner tube combination described above (and shown in FIGS. 1-14), the zone B 410B heat intensities can be matched by adjusting the valve to the low, medium, and high settings respectively. In the event that the zone A heat source 460A includes a supplementary sear-zone burner tube, like the ones described above and shown in FIGS. 15-20), the zone B 410B heat intensities can be matched by turning off the supplementary burner tube and adjusting the remaining standard burner tubes in zone A to the low, medium and high settings, respectively.

Although the inventions claimed herein have been described in considerable detail with reference to certain preferred embodiments, one skilled in the art will appreciate that the inventions can be practiced by other than the embodiments described herein, which have been presented for purposes of illustration and not of limitation. Therefore, the spirit and scope of the appended claims should not be limited to the description of the embodiments contained herein.

We claim:

1. A barbecue grill assembly comprising:
   a cooking chamber with a cooking surface, the cooking surface having at least two portions including a first portion and a second portion;
   the first and second portions of the cooking surface each having at least one heat source being disposed thereunder;
   each of the at least one heat source for the first portion having at least a highest setting, wherein a first maximum heat output is provided to the first portion of the cooking surface when set at the highest setting; and
   each of the at least one heat source for the second portion having a highest setting, wherein a second maximum heat output is provided to the second portion of the cooking surface when set at highest setting,
   wherein the second maximum heat output provided to the second portion of the cooking surface is greater than the first maximum heat output provided to the first portion of the cooking surface.

2. The barbecue grill assembly of claim 1, further comprising:
   each of the at least one heat source for the first portion having at least a highest setting also includes having at least a lowest setting and an off setting, wherein a first minimum heat output is provided to the first portion of the cooking surface when set at the lowest setting;
   wherein the at least one heat source for the second portion being capable of providing a heat output which is approximately equal to the first minimum heat output; and
   wherein the second maximum heat output is equal to 1.1 to 1.3 times the first maximum heat output.

3. The barbecue grill assembly of claim 1, wherein the at least one heat source for the second portion includes at least one supplementary burner and at least one standard burner.

4. The barbecue grill assembly of claim 3, wherein the supplementary burner must be turned off in order for the heat source for the second portion to produce a heat output which is approximately equal to the first minimum heat output.

5. The barbecue grill assembly of claim 1, wherein the at least one heat source for the first portion includes two standard burners and the at least one heat source for the second portion includes two standard burners and one supplementary burner, each of the standard burners in both the first and second portions being configured to produce the same heat output.

6. The barbecue grill assembly of claim 5, wherein the supplementary burner is disposed between the two standard burners and includes a cross-ignition channel which is adapted to provide ignition gas to one or both of the two standard burners.

7. The barbecue grill assembly of claim 5, wherein the cooking surface further comprises a third portion, the third portion having a heat source which includes two standard burner tubes, the heat source for the third portion having a highest setting, a lowest setting, and an off setting, whereby the two standard burner tubes, when combined, provide a third maximum heat output when the heat source is set at the highest setting, and whereby the two standard burner tubes, when combined, provide a third minimum heat output when the heat source is set at the lowest setting, the third maximum heat output being equal to the first maximum heat output and the third minimum heat output being equal to the first minimum heat output.

8. The barbecue grill assembly of claim 7, wherein the second portion of the cooking surface is centrally located between the first and third portions.

9. The barbecue grill assembly of claim 2, wherein each of the at least one heat source for the second portion includes a valve having a sear setting and a low setting, whereby when the valve is set to the sear setting, the at least one heat source provides the second maximum heat output, and when the valve is set to the low setting, the at least one heat source provides a heat output which is approximately equal to the first minimum heat output.

10. A barbecue grill assembly comprising:
    a cooking chamber with a cooking surface, the cooking surface having at least two portions including a first portion and a second portion;
    the first and second portions of the cooking surface each having at least one heat source being disposed thereunder;
    each of the at least one heat source for the first portion having a highest setting, a lowest setting, and an off setting, wherein a first maximum heat output is provided to the first portion of the cooking surface when set at the highest setting, and wherein a first minimum heat output is provided to the first portion of the cooking surface when set at the lowest setting;
    each of the at least one heat source for the second portion having a highest setting, wherein a second maximum heat output is provided to the second portion of the cooking surface when set at the highest setting;
    the at least one heat source for the first portion being capable of providing a first maximum heat intensity and a first minimum heat intensity, the first maximum heat intensity being equal to the first maximum heat output divided by the area of the first portion, the first minimum heat intensity being equal to the first minimum heat output divided by the area of the first portion;
    the at least one heat source for the second portion being capable of providing a second maximum heat intensity, the second maximum heat intensity being equal to the second maximum heat output divided by the area of the second portion;

the second maximum heat intensity being greater than or equal to the first maximum heat intensity; and, the at least one heat source for the second portion being capable of providing a heat intensity which is approximately equal to the first minimum heat intensity.

11. The barbecue grill assembly of claim 10, wherein the second maximum heat intensity is equal to 1.1 to 1.3 times the first maximum heat intensity.

12. The barbecue grill assembly of claim 10, wherein the at least one heat source for the second portion includes at least one supplementary burner and at least one standard burner.

13. The barbecue grill assembly of claim 12, wherein the supplementary burner must be turned off in order for the heat source for the second portion to produce a heat intensity which is approximately equal to the first minimum heat intensity.

14. The barbecue grill assembly of claim 10, wherein the at least one heat source for the first portion includes two standard burners and the at least one heat source for the second portion includes two standard burners and one supplementary burner, each of the standard burners in both the first and second portions being configured to produce the same heat output.

15. The barbecue grill assembly of claim 10, wherein the heat source for the second portion includes two standard burners and one supplementary burner, whereby the supplementary burner is disposed between the two standard burners and includes a cross-ignition channel which is adapted to provide ignition gas to one or both of the two standard burners.

16. The barbecue grill assembly of claim 10, wherein:
the cooking surface further comprises a third portion, the third portion having at least one heat source;
each of the at least one heat source for the third portion having a highest setting, a lowest setting, and an off setting, whereby the at least one heat source, when combined, provides a third maximum heat output when set at the highest setting, and whereby the at least one heat source, when combined, provides a third minimum heat output when set at the lowest setting;
the at least one heat source for the third portion being capable of providing a third maximum heat intensity and a third minimum heat intensity, the third maximum heat intensity being equal to the third maximum heat output divided by the area of the third portion, the third minimum heat intensity being equal to the third minimum heat output divided by the area of the third portion; and,
the third maximum heat intensity being equal to the first maximum heat intensity and the third minimum heat intensity being equal to the first minimum heat intensity.

17. The barbecue grill assembly of claim 16, wherein the second portion of the cooking surface is centrally located between the first and third portions.

18. The barbecue grill assembly of claim 10, wherein each of the at least one heat source for the second portion includes a valve having a sear setting and a low setting, whereby when the valve is set to the sear setting, the at least one heat source provides the second maximum heat output, and when the valve is set to the low setting, the at least one heat source provides a heat intensity which is approximately equal to the first minimum heat intensity.

* * * * *